US007765307B1

(12) United States Patent
Kritov et al.

(10) Patent No.: US 7,765,307 B1
(45) Date of Patent: Jul. 27, 2010

(54) BULK NETWORK TRANSMISSIONS USING MULTIPLE CONNECTIONS PRIMED TO OPTIMIZE TRANSFER PARAMETERS

(75) Inventors: Slava Kritov, Palo Alto, CA (US); Hans F. van Rietschote, Sunnyvale, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1002 days.

(21) Appl. No.: 11/364,034

(22) Filed: Feb. 28, 2006

(51) Int. Cl.
G06F 15/16 (2006.01)
(52) U.S. Cl. .................................. 709/228; 709/227
(58) Field of Classification Search ................ 709/227, 709/228
See application file for complete search history.

(56) References Cited

U.S. PATENT DOCUMENTS

| 5,748,919 A * | 5/1998 | Blackmon et al. ........... 710/307 |
| 7,353,286 B2 * | 4/2008 | Brown et al. ................. 709/235 |
| 7,436,772 B2 * | 10/2008 | Padhye et al. ............... 370/235 |

OTHER PUBLICATIONS

Sivakumar, et al; "PSockets: The Case for Application-level Network Striping for Data Intensive Applications using High Speed Wide Area Networks"; Conference on High Performance Networking and Computing, Proceedings of the 2000 ACM/IEEE conference on Supercomputing (CDROM); Dallas, TX; 2000.*

"GetRight® Screenshots"; Headlight Software, Inc.; Internet; 2005; http://www.getright.com.
"Detecting Duplex Mismatch on Ethernet"; Shalunov, et al; 6th Workshop on Passive and Active Measurements; Boston, MA; Mar. 31, 2005.
"Veritas Backup Exec™ 10 for Windows Servers"; White Paper; Veritas Software Corporation, Mountain View, CA; 2005.
"PSockets: The Case for Application-level Network Striping for Data Intensive Applications using High Speed Wide Area Networks"; Sivakumar, et al; Conference on High Performance Networking and Computing, Proceedings of the 2000 ACM/IEEE conference on Supercomputing (CDROM); Dallas, TX; 2000.

\* cited by examiner

Primary Examiner—Yves Dalencourt
Assistant Examiner—Michael C Lai
(74) Attorney, Agent, or Firm—Meyertons, Hood, Kivlin, Kowert & Goetzel, P.C.

(57) ABSTRACT

A system for bulk network transmissions using multiple connections primed to optimize transfer parameters includes one or more processors and memory coupled to the processors. The memory stores program instructions executable by the processors to establish a plurality of network connections designated to be used for a single bulk data transfer. The instructions are further executable to adjust the values of one or more configuration parameters of each of the connections. The adjusting includes sending one or more priming packets over each of the connections. The instructions are also executable to perform the bulk transfer as a sequence of sub-transfers. Each sub-transfer includes a transmission of a predetermined amount of application data over each connection of a selected subset of the plurality of network connections.

21 Claims, 10 Drawing Sheets

BULK NETWORK TRANSMISSIONS USING MULTIPLE CONNECTIONS PRIMED TO OPTIMIZE TRANSFER PARAMETERS

BACKGROUND OF THE INVENTION

1. Field of the Invention

This invention relates to computer systems and, more particularly, to the management of network traffic comprising large data transfers between computer systems.

2. Description of the Related Art

In today's enterprise environments, more and more applications rely on bulk data transfers to accomplish their functionality. Applications that require large amounts of data to be transferred between one network endpoint and another for a single application-level job or task may include, for example, storage management applications of various types, such as backup and restore applications, disaster recovery applications and the like, media server applications that may be required to transmit movie and audio files, telephony (e.g., voice over IP) and other telecommunications applications, scientific analysis and simulation applications, geographically distributed software development projects, and so on. The amount of data that has to be transferred for a given job or task varies with the specific applications and use cases, but can easily reach several tens of megabytes or even gigabytes in some cases. Furthermore, the data often has to be transferred over large distances: e.g., a disaster recovery application may be configured to replicate data from a primary data center in the United States to another data center in Europe or Asia.

As the emphasis on interoperability, vendor-independence and the use of standards-based technologies for IT infrastructures has increased, most of these bulk data transfers are performed over networks that employ long-established network protocols such as TCP/IP (Transmission Control Protocol/Internet Protocol). The most commonly used networking protocols in both public networks and private networks today, including TCP/IP, were developed before large bulk data transfers became as common as they are today. As a result, these protocols, at least in default configurations, are typically not optimized for large bulk data transfers, and in fact exhibit some behaviors that may be strongly detrimental to bulk data transfer performance.

TCP/IP, for example, implements a variety of built-in responses to apparent or actual error conditions that can negatively impact bulk data transfers. When one or more packets of a given data transfer are lost or "dropped", which may occur for a variety of reasons, TCP/IP automatically adjusts one or more parameters such as transmit window size, retransmission timeout values, etc. to reduce the likelihood of cascading errors. In addition, a packet loss or an out delivery of a packet may lead to an automatic retransmission of all the packets that were sent after the lost or out-of-order packet. A substantial amount of processing and/or bandwidth may have to be used just for retransmissions caused by an occasional packet loss or out-of-order delivery, even though some of the original packets sent after the lost packet may have already been received successfully at the destination. Although some techniques (such as Selective Acknowledgment (SACK) mechanisms) have been proposed to reduce the impact of unnecessary retransmissions in TCP/IP, in practice these techniques have had limited success, especially in environments where a sender may be capable of injecting packets into the network fairly rapidly, relative to the time taken by the packets to traverse the network to the intended destination (thus leading to a large number of in-flight packets on a given connection). Packet loss may occur for a number of reasons: e.g., due to temporary micro-congestion at a network device such as a switch caused by near-simultaneous reception of a large number of data packets, as a result of suboptimal routing decisions, as a result of misconfiguration of network equipment (such as Ethernet duplex mismatch), or as a result of faulty wiring or equipment on one or more network paths. In response to the packet loss, the transmit window size may be reduced automatically by the protocol, and retransmission timeouts may be increased. In some cases, especially in the event of a number of consecutive packet losses or multiple packet losses that are closely spaced in time, the parameters may be modified to such an extent (e.g., a transmit window size may be reduced to such a small value) that the data transfer may in effect be stalled, with very, little data actually being transmitted. Substantial reductions in throughput may occur even if the packet losses were transient, i.e., even if the network recovers fairly rapidly from the events or conditions that led to the packet loss. In many of these cases, even after the conditions that led to the packet loss no longer hold, it takes the networking protocol a substantial amount of time to recover and adjust parameters such as window sizes to values that are appropriate for bulk data transfers. During these recovery or "self-healing" periods, bulk data transfers are often effectively blocked, which can result in timeouts or other apparent errors in application-level protocols (such as backup or replication protocols), potentially requiring large application jobs to be abandoned and restarted.

A number of different approaches to tuning network traffic have been considered. Some such schemes either require changes to standard network software stacks or require custom hardware; however, such schemes are difficult to implement in environments that rely on standards-based and vendor-independent communication technologies. Techniques that require substantial changes to legacy applications or third-party applications are also unlikely to be deployed in most enterprise environments.

SUMMARY

Various embodiments of systems and methods for bulk network transmissions using multiple connections primed to optimize transfer parameters are disclosed. According to one embodiment, a system comprises one or more processors and memory coupled to the processors, wherein the memory stores program instructions executable by the processors to establish a plurality of network connections designated to be used for a single bulk data transfer. The instructions, which may be incorporated into a traffic manager software module or a set of traffic manager modules in some embodiments, may be further executable to adjust the values of one or more configuration parameters of each of the connections, e.g., to a value appropriate for bulk data transfers, wherein said adjusting includes sending one or more priming packets over each of the connections. By sending a sequence of small priming packets over a connection, for example, the transmit window size of the window may be increased automatically by the network protocol in use to a desired value or to within a desired range of values in one implementation. The instructions may also be executable to perform the bulk transfer as a sequence of sub-transfers, wherein each sub-transfer includes a transmission of a predetermined amount or stripe of application data over each connection of a selected subset of the plurality of network connections. The remaining connections, i.e., those not included in the subset selected for data transmission in a particular sub-transfer, may serve as "spare" connections that have already been tuned for bulk data transfer and so may be used, for example, to quickly retransmit data if performance over one of the selected subset of transactions is found to be unsatisfactory. By priming or preparing a set of connections, parallelizing data transfer over multiple primed connections, and keeping a subset of the connections as spares during any given sub-transfer, a traffic manager may provide sustained high throughputs and may quickly adjust to changing conditions in the network, instead of, for example, relying on gradual healing of congested connections by the underlying network protocol. Furthermore, the high throughput and rapid adjustments to changing conditions may be achieved in some embodiments without requiring changes to application code, operating system code or networking software stack code.

In one embodiment, the subsets of connections used for consecutive sub-transfers may be varied, so that, for example, at least one connection used to transfer data during a given sub-transfer is kept as a "spare" connection during the next sub-transfer for the same bulk transfer. By systematically selecting different subsets of connections for data transfer in successive sub-transfers, e.g., in a round-robin manner, the instructions may be executable to ensure that each of the plurality of connections is used frequently enough that its parameters remain set to appropriate values, and that no single connection remain idle for too long.

In some embodiments, the instructions may be executable to determine whether achieved performance on each connection used during a sub-transfer is satisfactory, i.e., whether one or more performance metrics for each connection meet a threshold performance criterion. If the performance over any given connection fails to meet the threshold criterion, the instructions may be further executable to take one or more remedial actions. For example, in one embodiment, if performance over a particular connection is unsatisfactory, the data sent over than connection during the latest sub-transfer may be retransmitted over a selected "spare" connection. In another embodiment, the unsatisfactory connection may be closed and a new connection may be established as a replacement. One or more configuration parameters of the new connection may be adjusted in a manner similar to the initial adjustment of parameters for the plurality of connections, e.g., by sending priming packets over the new connection, and the new connection may then be included in the set of connections to be used for subsequent sub-transfers. In one embodiment, the instructions may be further executable to insert instrumentation into packets sent over the connections used for the bulk transfer, e.g., to obtain performance metrics used to determine whether performance over a given connection is satisfactory or not.

By dynamically adjusting parameters as needed based on actual measurements, and by spreading the data transfer across a dynamically changing set of in-use connections, some of the problems that may otherwise result from more global or static conventional tuning actions may be avoided in various embodiments. For example, in conventional systems, a global change to increase window size for all connections established from a particular host to a very large size may lead to excessive retransmission-related costs in the event of a packet loss on a given connection. Under some conditions, for example, for a connection with a window size of W packets, (W/2) packets may be retransmitted on average in the event of a single packet loss. In contrast, in one embodiment, for a specific data transfer that requires a large amount of data to be transferred, a traffic manager may establish an "effective" window size of (m*w) using the above techniques, where m is the number of in-use connections and w is the average window size for the in-use connections, without incurring the potential retransmission-related penalties associated with a single large window size of (m*w). Configuration parameter settings for other transmissions, e.g., small transfers unrelated to the bulk data transfer, may be unaffected by the traffic manager, and such other transmissions would have a higher probability of obtaining access to resources (such as processing cycles and bandwidth) that might have to be dedicated to large retransmissions in conventional systems.

Figure 1:
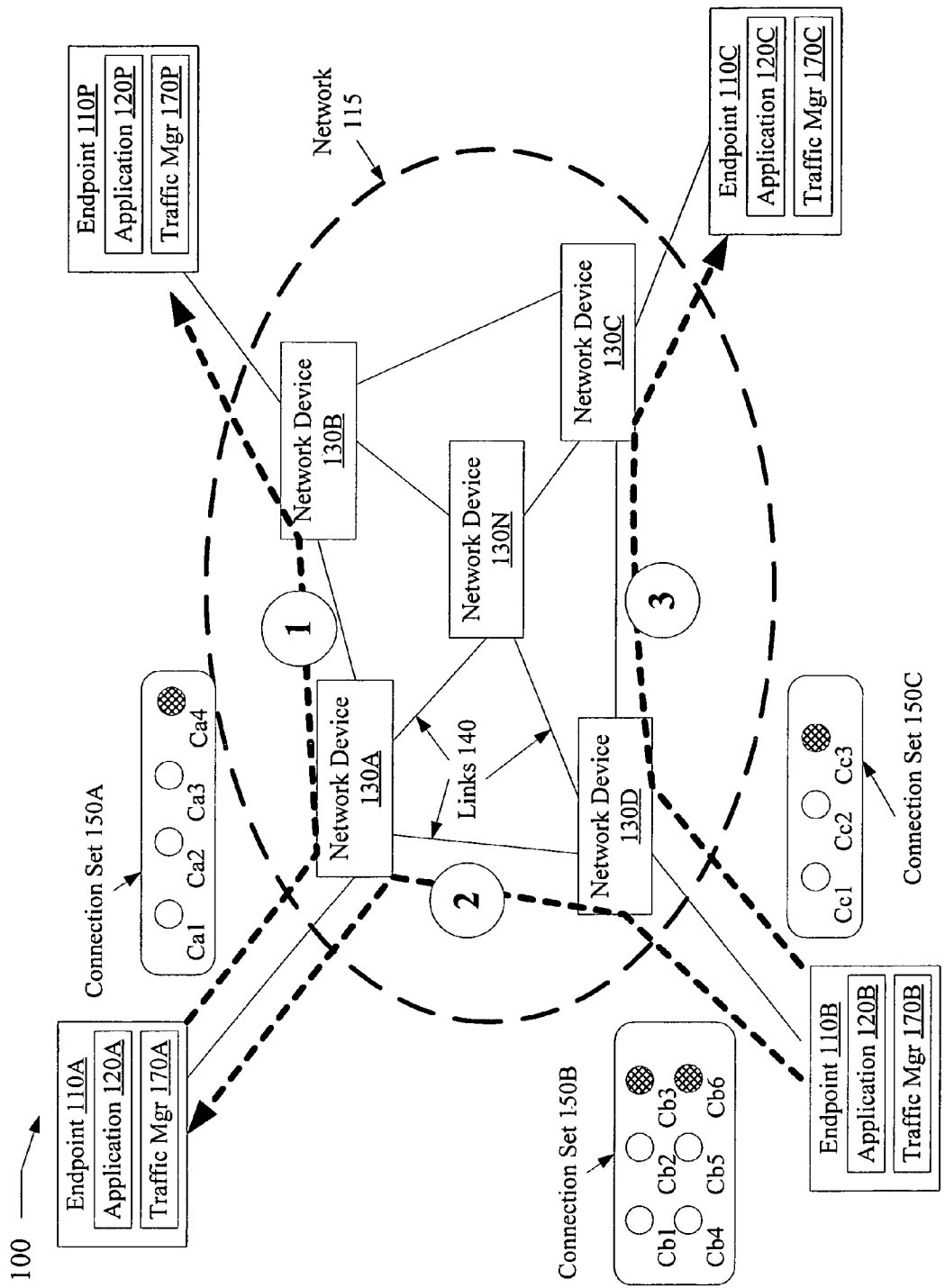
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a system 100 according to one embodiment. As shown, system 100 comprising a plurality of network endpoints 110 (e.g., endpoints 110A-110P) linked to a network 115 that includes a plurality of network devices 130 (e.g., network devices 130A-130N). An endpoint 110 may include any of a variety of devices, such as computer servers, desktops, laptops, personal digital assistants, mobile telephony devices, television set-top boxes, audio receivers, etc., configured to support applications 120 (e.g., application 120A at endpoint 110A, application 120B at endpoint 120B, and so on) that require network access and perform at least some bulk data transfers over the network. Traffic managers 170 (e.g., traffic manager 170A at endpoint 110A, traffic manager 170B at endpoint 170B, etc.) at one or more of the endpoints 110 may be configured to establish and maintain a plurality of connections corresponding to each bulk transfer to be performed (e.g., connection set 150A may be maintained for a bulk data transfer indicated by the dashed line labeled "1" in FIG. 1 from endpoint 110A to endpoint 110P). Traffic manager 170 may be configured to adjust one or more configuration parameters of each of the connections, e.g., to a value appropriate for bulk data transfers. For example, in one embodiment, traffic manager 170 may send a series of small priming packets over each of the connections so that the transmit window for each of the connections reaches a desired size or size range. The term "configuration parameters" for a network connection, as used herein, generally refers to one or more settings that may determine the manner in which data is transferred over that network connection, such as transmit window size, retransmission delay, maximum number of retransmissions of a given packet before aborting a connection, how often "keep alive" packets are sent to verify that an idle connection remains intact, etc. Different sets of configuration parameters may govern connection data transfer behavior in various embodiments, e.g., based on the networking protocol or protocols in use, the operating systems of participating hosts (e.g., endpoints 110), specific networking hardware and/or software versions, etc.

The traffic manager 170 may be configured to perform the bulk data transfer as a sequence of sub-transfers, where each sub-transfer includes a transmission of a predetermined amount of the data over each network connection of a selected subset of the set of network connections. During each sub-sequence, data may be transmitted concurrently (i.e., in parallel) over the selected subset of connections in one embodiment. Successive sub-transfers for a given bulk data transfer may use different subsets of the connection set in some embodiments, so that, for example, each of the connections in a connection set is used frequently enough that its configuration remains optimized for bulk transfers, and none of the connections is closed as an "idle" connection or has its parameters reset by the networking protocol in use. The connections that are unused during a given sub-transfer may be considered primed "spares" held in reserve for future sub-transfers, with their configuration parameters set to the desired values in advance. The roles of "spares" and "in-use" connections may be rotated during successive sub-transfers: e.g., a particular connection that is a "spare" during one sub-transfer may be an "in-use" connection for an other sub-transfer that occurs within a short time thereafter, so that one or more configuration parameters for that connection do not get automatically adjusted to values that differ from the desired values, as might occur if the connection remains idle for too long. For example, TCP/IP may automatically shrink the window size of a connection determined to be idle, and the rapid rotation of a connection between "spare" and "in-use" roles may help to avoid such shrinkage.

If a particular connection of the set fails to meet a threshold performance criterion in a given sub-transfer, in one embodiment corrective action may be taken to ensure that throughput remains at a desired level, and that a desired minimum number of primed connections pre-tuned for bulk data transfer remain available. For example, the data that was sent over the problematic connection during the latest sub-transfer may be retransmitted over another connection of the connection set, and/or the problematic connection may be replaced in the connection set by a fresh primed connection in some embodiments.

By maintaining and using a plurality of primed connections dedicated to each given bulk data transfer in this manner, traffic manager 170 may ensure that at least some of the problems (such as small window size settings that result from transient congestion in the network) often encountered during large bulk transfers are avoided in system 100, and as a result, higher throughputs may be achieved for the bulk data transfers than with conventional approaches. The improved performance may be achieved without incurring some of the retransmission-related penalties that might have to be paid in conventional systems, such as large amounts of retransmitted packets and "hiccups" or periods of slower throughput resulting from increased retransmission delays. In some conventional systems, for example, where all the packets sent after a particular dropped or lost packet are retransmitted, (W/2) packets may be retransmitted on average in the event of a single packet loss on a connection with a window size of W packets. (This is because, on average, for a large data transfer, W packets may be in flight if the window size is W packets, and any one of the W packets may be lost with an equal probability; thus, on average, the "middle" packet of the W packets may be the one that is lost, leading to a retransmission of the following (W/2) packets.) In contrast, in one embodiment, for a specific data transfer that requires a large amount of data to be transferred, using the above techniques a traffic manager 170 may establish an "effective" window size of (m*w), where m is the number of in-use connections and w is the average window size for the in-use connections, without incurring the potential retransmission-related penalties associated with a single large window size of (m*w). Furthermore, in some embodiments, the functionality of the traffic manager may be implemented without requiring any code changes to applications 120, to the operating system or to the networking software stacks used at the endpoints 110, and may thus be platform-independent—for example, a sending endpoint such as 110A may have a different operating system than a receiving endpoint such as 110P. Further details regarding various aspects of the operation of traffic managers 170 to support bulk data transfers are provided below.

In the example scenario depicted in FIG. 1, three connection sets 150A, 150B and 150C are shown. Connection set 150A comprises four connections, Ca1-Ca4, that have been set up by traffic manager 170A for bulk data transfer "1" from endpoint 110A to endpoint 110P. Connection set 150B comprises six connections, Cb1-Cb6, that have been set up by traffic manager 170B for bulk data transfer "2" (indicated by the dashed line labeled "2") from endpoint 110B to endpoint 110A, and connection set 150C comprises three connections, Cc1-Cc3, set up by traffic manager 170B for the bulk data transfer labeled "3" from endpoint 110B to endpoint 110C. Within each connection set 150 (e.g., 150A, 150B and 150C), the subset of connections that are in use for a current sub-transfer are indicated by empty circles, and the subset that are not in use for the sub-transfer are indicated by circles that are cross-hatched. In connection set 150A, for example, three out of the four connections (Ca1, Ca2 and Ca3) are in use while the fourth (Ca4) is held in reserve; in connection set 150B, four of the six connections are in use and the remaining two are not currently in use; and in connection set 150C, two out of the three connections are currently in use while one is held in reserve. As shown in FIG. 1, the sizes of the connection sets used for different bulk transfers may differ in some embodiments. The number or fraction of in-use connections within a connection set 150 may also vary from connection set to connection set. Each traffic manager 170 (e.g., traffic manager 170B in FIG. 1) may establish a plurality of connection sets, potentially of different sizes, to handle respective bulk data transfers. Furthermore, the size of a connection set 150 maintained for a given bulk data transfer, and/or the fraction of its connections in use during a given sub-transfer, may also vary over time in some embodiments. In one embodiment, a traffic manager 170 may initially start with a set of N connections for a given bulk data transfer of which M connections are to be used in each sub-transfer and (N-M) are to be held in reserve, but may increase or decrease the number of connections in the set or the number to be held in reserve while the given bulk data transfer is still in progress, e.g., based on current network conditions and/or the performance achieved thus far. In addition, the traffic manager 170 may rapidly change the role of each connection from "in-use" to "spare" connection as described above, possibly numerous times during a single bulk data transfer, e.g., to avoid undesired values being set for connection parameters by the underlying networking protocol. In some embodiments, the traffic manager 170 may be configured to instrument packets of the bulk data transfer to monitor the achieved performance in real time, as described below in further detail, and may use the real-time monitoring results to adjust the size and/or in-use fraction of the connection sets.

Bulk data transfers for any of numerous types of applications 120 may be supported at endpoints 110 in different embodiments, including storage management applications (e.g., distributed file systems, backup/restore, replication, and disaster recovery applications), telephony and other telecommunication applications (e.g., voice over IP), media servers, bioinformatics applications, distributed simulation applications, geographically distributed software development projects, etc. Network devices 130 may include switches, routers, gateways, and any other devices that participate in or help manage transmission of data within the network 115. Any of a variety of networking technologies (e.g., Ethernet, Asynchronous Transfer Mode (ATM), Fibre Channel, etc.) and corresponding software and/or hardware protocols may be used singly or in combination within network 115 in various embodiments. The term "bulk data transfer", as used herein, refers to a transfer of data on behalf of an application task, such as a transfer of a requested video or audio file, or a backup of a specified source data set, where the amount of data to be transferred for the task is sufficiently large that the data is typically transmitted in the network using multiple packets or messages. The terms "application task" and "application job" may be used herein to refer to a unit of work performed using an application, for example work performed in response to a single request initiated by a user or by another application. The terms "packet", "network message" and "message" may be used herein generally to refer to units in which data and/or control information is transmitted over the network 115; the specifics of how packets or messages are organized internally may vary from protocol to protocol and from network type to network type in various embodiments. As viewed from a network device 130, incoming and outgoing traffic streams may comprise packets from a variety of bulk data transfers (as well as packets corresponding to short, non-bulk communications) mingled together; typically, a network device 130 may not be able to distinguish packets of one data transfer from those of another. Often, a single bulk data transfer for a single application task may comprise sending hundreds or thousands of data packets from one endpoint 110 to another.

Subsets of the endpoints 110 and network devices 130 shown in FIG. 1 may be administered or controlled by different organizations in some embodiments. For example, in one embodiments, endpoint 110A may be a video server managed by a media company, while endpoint 110P may be a home computer owned by a customer of the media company, and the network devices 130 participating in a bulk data transfer of a video file from endpoint 110A to endpoint 110P may be owned and controlled by one or telecommunication companies. In general, no single entity may have complete control over the endpoints 110 and/or the network devices 130 involved in a given data transfer. The sending and receiving endpoints 110 may be unaware of the specific path taken by packets of a bulk data transfer over a given connection, and the paths taken by different packets of a given bulk data transfer may differ.

The protocols in use in network 115 may be configured to automatically modify various connection parameters in response to changing conditions in some embodiments. For example, in one embodiment where the Transmission Control Protocol/Internet Protocol (TCP/IP) family of protocols is used in network 115, a sliding window technique may be implemented for flow control, in which a "transmit window" (which may alternatively be referred to herein as a "send window" or simply a "window") may be maintained at each endpoint for each connection. The number of packets that can be unacknowledged at any given time may be constrained by the transmit window: for example, if the transmit window for a given connection at a given endpoint 110 is currently set to 16 packets, this means that the sending endpoint may transmit up to 16 packets before it receives an acknowledgment. In addition to being dependent on the speed of the various network devices 130 and links 140 used for a given connection, and on the processing speeds at the endpoints 110 involved in the connection, the throughput achieved over the connection may also depend on the transmit window size. In particular, for bulk data transfers, a larger transmit window size may in general be more suitable than a smaller transmit window size. A large transmit window size tends to allow more data of the transfer to be "in flight" at any given point in time, thus potentially utilizing the network's resources more effectively than if acknowledgments had to be received for every packet or every few packets. TCP/IP implementations typically dynamically adjust the transmit window size for a given connection, based on a number of factors, to manage flow control and to respond to congestion. For example, in some implementations, the transmit window size is typically set to a minimum of a "receiver advertisement" and a "congestion window". The "receiver advertisement" may be an indication from the receiving endpoint 110 of the amount of data the receiving endpoint is currently prepared to accept, e.g., based on buffer sizes available at the receiving endpoint and the speed at which the receiving endpoint can process the incoming data. For many endpoints 110 equipped with powerful processors and large amounts of memory, the receiver advertisement may typically be quite large, and the transmit window size may therefore typically be governed largely by the "congestion window".

The "congestion window" may be modified by the protocol in response to dropped packets, which may occur for a variety of reasons as described below in further detail. When a connection is first established, a technique called "slow-start" may be used in some TCP/IP implementations, in which the initial congestion window size is set to a small value (such as one packet) and increased by a small amount (e.g., one packet) each time an acknowledgment is received. In one exemplary implementation of slow-start, the initial congestion window may be set to one, and increased to two packets when the acknowledgment for the first packet is received. The sender may then send up to two packets and wait for acknowledgments. When acknowledgements for the two packets are received, the congestion window may be increased to four;

when acknowledgments for the next four packets are received, the congestion window may be set to eight, and so on In the absence of packet loss, the congestion window size may thus gradually increase, up to a maximum usually limited by an operating system and/or by configurable parameters. To reach a congestion window size of N packets, for example, $\log_2 N$ round trip transmissions may be required if no packet loss is encountered. If a packet is lost, however, the TCP/IP implementation may decrease the congestion window by a substantial amount, e.g., by half. This reduction may be repeated for every packet lost: e.g., if the window size is 128 packets, a first packet loss may reduce the congestion window to 64 packets, a second consecutive packet loss may reduce the congestion window to 32 packets, and so on, until a minimum congestion window size of one packet is reached. In addition to decreasing congestion window sizes, the protocol may also modify other parameters in response to packet loss, such as increasing retransmission timers for the packets that remain in flight. After the congestion window is decreased due to a packet loss, it may be increased again only gradually, e.g., in some TCP/IP implementations, the protocol may enter a "congestion-avoidance" mode of operation in which window size is incremented by just one packet per received acknowledgment. Thus, even a small number of lost packets may significantly affect congestion windows, and hence, transmit window sizes. In many cases, packet loss may be a transient phenomenon, but even after the causes that led to the packet loss are no longer in effect, it may take a while for the transmit window sizes to reach large values suitable for bulk data transfers.

Network packets may be lost or dropped for a variety of reasons in different embodiments, many of which can be corrected fairly quickly. A particular network device 130 or link 140 that forms a part of the network path for a bulk data transfer may fail, for example; however, an alternative path may rapidly be found for remaining packets of the data transfer. In some cases, packets may be dropped due to transient congestion phenomena at a given network device 130: e.g., if a large number of packets happen to arrive at about the same time at a given input port of a network switch, the buffer space available for the input port may be temporarily overrun. Similarly, if a large number of packets happen to be routed out from a given output port of a network device at about the same time, the buffers available for the outbound packets at the port may be exhausted, and one or more of the packets may have to be dropped. Such congestion events may be caused at least partly by the bursty nature of bulk data transfers, where, for example, an application 120 hands off a large amount of data for transmission to a networking software stack, and the software stack in turn transmits a large number of packets as quickly as possible into the network 115. The congestion effects of the bursty nature of traffic may quite often be very short-lived, however, since the bursts of outbound traffic from applications are often separated by long gaps of little or no outbound traffic. Dropped packets may also be the result of misconfiguration of network devices 130 or protocol parameters, which can also often be corrected shortly after they are detected. Even though many of the causes of dropped packets may quickly disappear, the dropped packets may lead to dramatic and sustained reductions in the throughput of bulk data transfers if, for example, the transmit window sizes are substantially reduced as a result. Furthermore, despite advances in networking technology, it may be hard or impossible to completely eliminate packet loss, especially over large decentralized networks such as the Internet that comprise a wide variety of network devices 130 and links 140. For example, small packet loss rates (e.g., less than one percent) are often observed even when the overall utilization of a network is relatively low.

Figure 2:
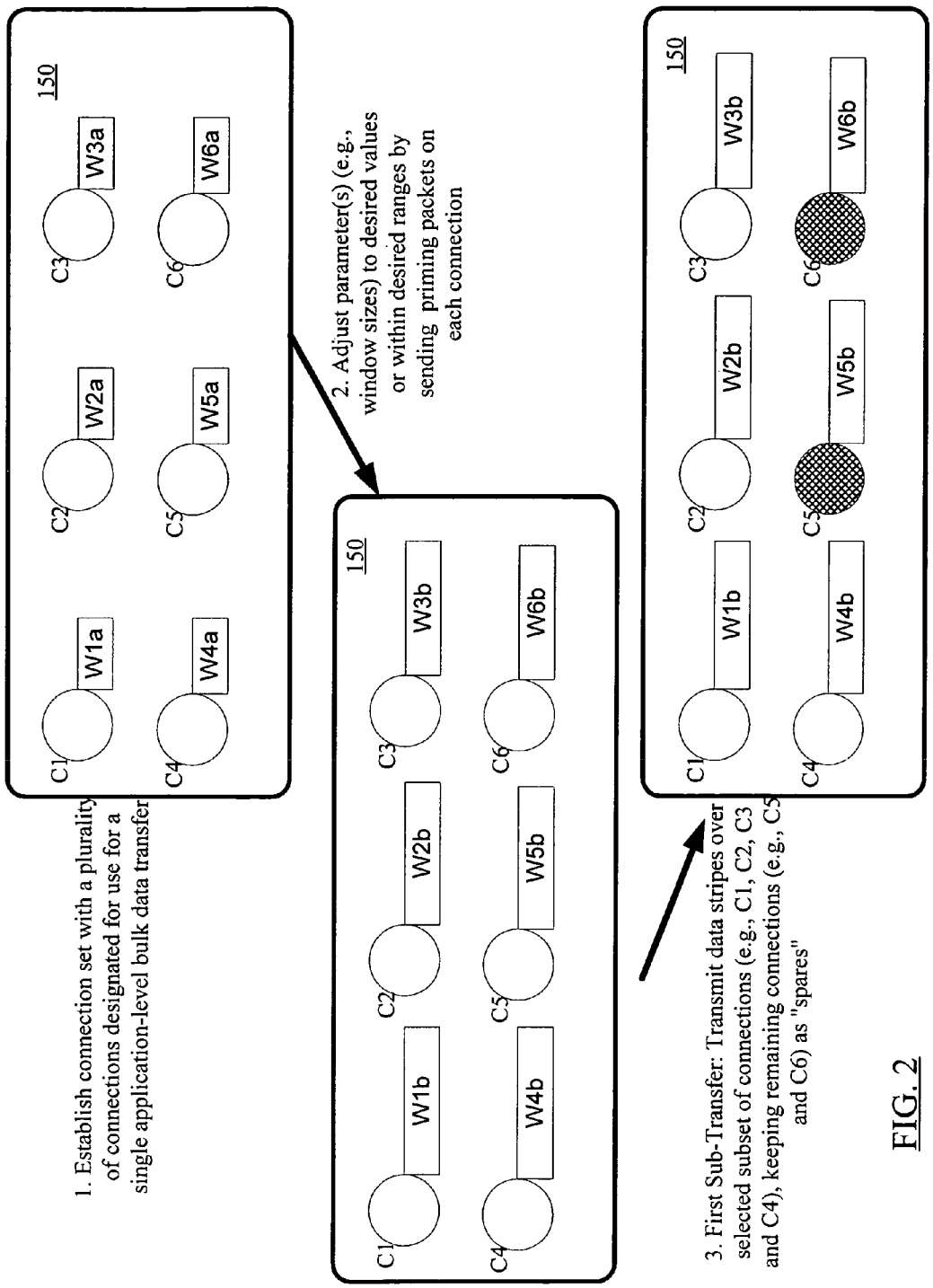
FIG. 2 is a block diagram illustrating aspects of the operation of a traffic manager corresponding to an exemplary initial setup of a connection set, according to one embodiment.

In some embodiments, traffic managers 170 may be configured to implement a technique of using "primed" connection sets 150 for bulk data transfers, for example to overcome some of the potential problems associated with packet losses described above. In one such technique, priming packets may be transmitted over the connections of a connection set 150 to set one or more parameters such as transmit window size to a desired value or to within a desired range, and connections may be discarded if the parameters are modified by the protocol to an undesirable value. FIG. 2 is a block diagram illustrating aspects of the operation of a traffic manager 170 corresponding to an exemplary initial setup of a connection set 150 as part of such a technique, according to one embodiment. As shown in the portion of FIG. 2 labeled "1", the traffic manager 170 at a sending endpoint 110 (i.e., the endpoint 110 from which data is to be transferred in bulk for an application task) may first establish a plurality of network connections, such as connections C1-C6, designated to be used to for a single bulk data transfer on behalf of an application 120. Depending on the nature of the networking protocol and/or operating system in use at the sending endpoint, one or more application programming interfaces (APIs) and/or system calls may be invoked by the traffic manager at the sending endpoint; and the establishment of each connection may require collaboration from a traffic manager 170 at the receiving endpoint 110 (the endpoint to which the data is to be transmitted). When established, each of the connections C1-C6 may each have default settings for a number of per-connection configuration parameters. In FIG. 2, for example, default initial transmit window sizes (indicating the amount of unacknowledged data allowed at any given time on the connection) for the connections C1-C6 are indicated by the labels W1$a$-W6$b$. In some embodiments, the connection set 150 may be established in response to a request to initiate an application task, such as a backup of a source data set, or a request to download a large file; in other embodiments, e.g., when a bulk data transfer between a pair of endpoints is considered likely and can therefore be anticipated in advance, the traffic manager may proactively set up one or more connection sets 150 prior to receiving a request for an application task. Application-specified and/or user-specified parameters may govern the specific number of connections to be established in some embodiments, while in other embodiments, traffic manager 170 may be configured to start with a default number of connections (e.g., ten) independent of the specific application or task characteristics, and adjust the number as needed during the bulk data transfer.

Having established at least some of the connections of connection set 150, the traffic manager may adjust one or more configuration parameters, e.g., by sending one or more priming packets over each established connection, as indicated in the illustration labeled "2" in FIG. 2. The term "priming packets", as used herein, refers to network messages transmitted over a connection from a sending endpoint of a bulk data transfer to a receiving endpoint with the primary purpose of adjusting one or more configuration parameters of the connection to a value appropriate for the bulk data transfer. The contents, number, and size of priming packets sent over a given connection may differ in various embodiments. In some embodiments, for example, where a transmit window size is to be adjusted to "N" packets in accordance with typical TCP/IP slow-start implementations described above, approximately $\log_2 N$ small packets may be sent as priming packets. Each priming packet in such an embodiment may be of the minimum supported size, and the data portion of each packet may contain garbage or padding. In other embodiments, the priming packets may comprise more useful payloads, such as payloads include control information related to the bulk data transfer, instrumentation data used to monitor performance of the connection, and/or a portion of the application data to be transmitted as part of the bulk data transfer. The sending traffic manager 170 may be configured to start sending priming packets as soon as each connection is established in some embodiments, and to wait until all the connections of the connection set are established before sending any priming packets in other embodiments.

In one embodiment, the sending traffic manager 170 may be configured to monitor, as the priming packets are sent, the values of the one or more configuration parameters being adjusted as a result of the priming packets, and to terminate the sending of priming packets when the desired adjustment has been achieved. For example, if a parameter has not reached the desired value or range for a given connection, another priming packet may be sent; and if the parameter has reached the desired value or range for the given connection, no further priming packets may be sent. In other embodiments, the traffic manager may not monitor the parameter values, relying instead on a fixed or default number of priming packets to have the desired effect on the parameter values. Values of the parameters being changed may be obtained, for example, using an API provided by a networking software stack in use at the endpoint, by reading packet header contents, or by other techniques in various embodiments. The target value for a given parameter may be a range (e.g., a transmit window size of at least K packets) in some embodiments, and a specific value (e.g., a transmit window size equal to the maximum transmit window size supported by the networking stack and/or operating system) in other embodiments. In one embodiment, the traffic manager 170 may be configured to make a "best-effort" adjustment to a configuration parameter, e.g., by sending a specified number of priming packets, and may terminate the stream of priming packets even if a targeted configuration parameter value has not been achieved. In the example illustrated in FIG. 2, the priming packets have resulted in the transmit window sizes being increased to W1$b$-W6$b$ for connections C1-C6 respectively. It is noted that among the connections within a given connection set 150, some of the adjusted values for a given parameter may differ in some implementations—e.g., the window size W1$b$ may not be identical to the window size W2$b$ in FIG. 2. Configuration parameters other than transmit window sizes, such as retransmission timeout values, maximum packet sizes, etc., may be adjusted in addition to and/or instead of transmit window sizes in various embodiments, depending for example on the specific networking protocol in use.

By increasing the window sizes using priming packets as described above, in some embodiments an "effective" window that is larger than the actual data size for any given connection may be achieved: e.g., if each of the six window sizes W1$b$-W6$b$ is "m" packets in FIG. 2, the total number of unacknowledged in-flight packets may be (6*m). At the same time, the benefits of increasing effective window size may be achieved without incurring the penalties of actually increasing the window size of any single connection to as large a value. For example, as described earlier, if a single connection's window size were to be set to 6*m, a packet loss on that single connection may lead to a retransmission, on average of 3*m packets in conventional systems; such large retransmissions are avoided by spreading the "effective" window across multiple connections, as well as by taking special corrective actions in the event of packet loss, as described below in conjunction with the description of FIG. 4. It is noted that negative effects of large numbers of retransmitted packets may not be limited to bulk data transfers in conventional systems; in fact, as more processing and/or bandwidth resources have to be devoted to the retransmissions of bulk data transfer packets, fewer resources may remain for use by shorter, non-bulk data transfers; in fact, under some circumstances, short transfers (or transfers over slow and/or lossy network links) may be starved or blocked from making progress primarily due to retransmissions associated with unrelated bulk data transfers.

After the parameter or parameters for at least some of the connections of a connection set 150 have been adjusted appropriately, transmission of the data corresponding to an application task may begin. The data may be transferred in a sequence of sub-transfers in some embodiments, in which only a subset of the connections are used in a given sub-transfer, and the remaining connections are held in reserve as "spare" connections (with their parameters already tuned appropriately) to be used for subsequent sub-transfers or in case one of the currently-used connections fails to meet a threshold level of performance. Packets may be transferred in parallel over the selected connections for a given sub-sequence in some embodiments. FIG. 2 illustrates an exemplary first sub-transfer in the section labeled "3", in which a portion of the application data is sent over each of connections C1-C4, while C5 and C6 are not used. Traffic manager 170 may be configured to subdivide the application data into partitions or "slices" for transmission over the selected subsets of connections in some embodiments; in other embodiments, the application itself or another software module may be responsible for partitioning the application data into slices. Successive slices may be sent over the in-use connections during a given sub-transfer: e.g., the application data corresponding to a given task may be subdivided into S slices in FIG. 2, and the first four slices may be sent over connections C1, C2, C3 and C4 respectively. During subsequent sub-transfers of the same bulk data transfer, a different set of connections may be used, as illustrated in FIG. 3.

Figure 3:
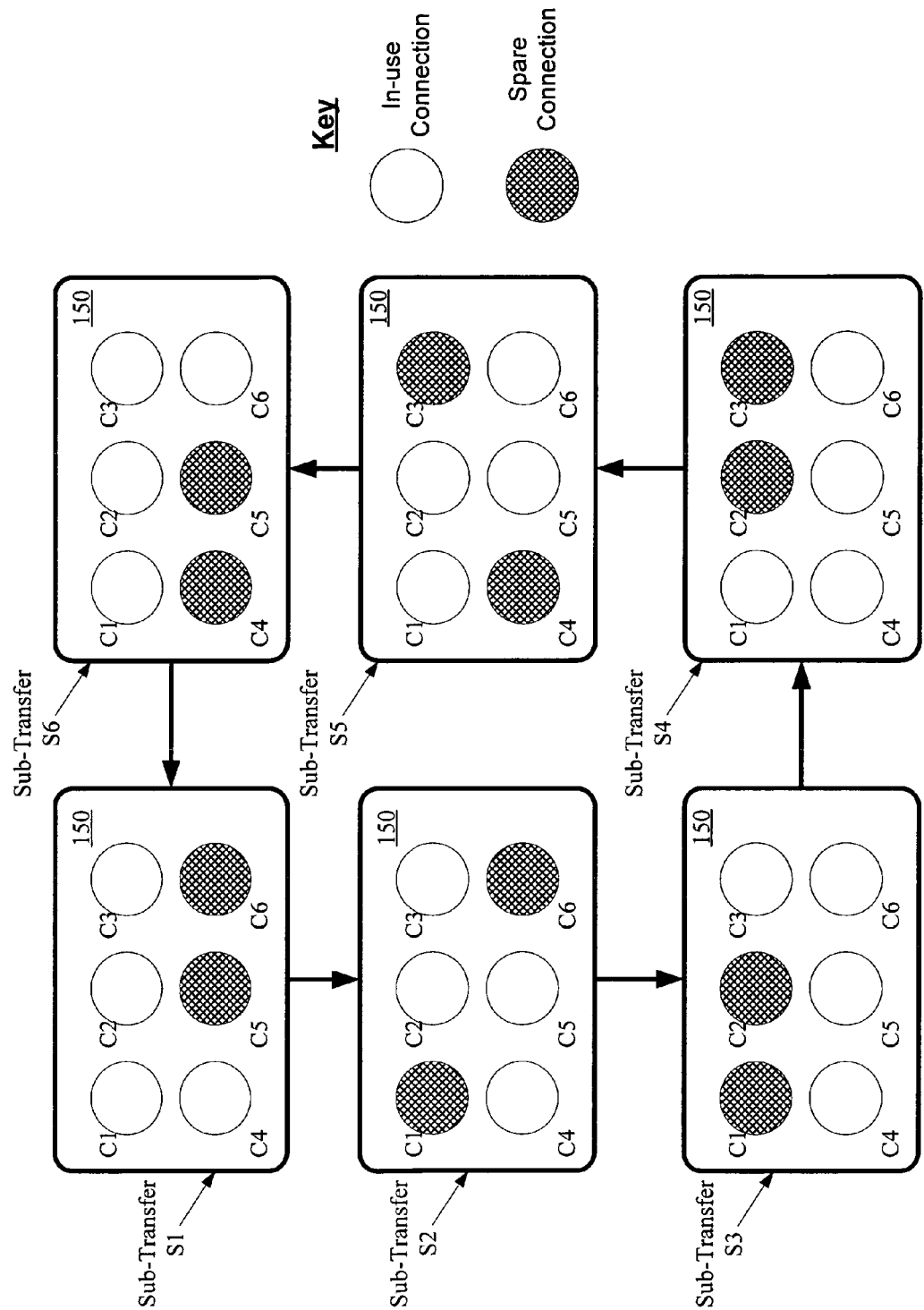
FIG. 3 is a block diagram illustrating an exemplary repeating pattern of six successive sub-transfers that may be included within a given bulk data transfer, according to one embodiment.

FIG. 3 is a block diagram illustrating an exemplary repeating pattern of six successive sub-transfers S1-S6 that may be included within a given bulk data transfer, according to one embodiment. In the depicted example, six connections C1-C6 are designated for the bulk data transfer, and during each successive sub-transfer, four of the six connections are used to transfer respective slices of application data, while two connections are held in reserve as spares. As shown, the roles of "spare" and "in-use" connections are rotated during successive sub-transfers, so that, for example, no single connection remains idle or "spare" for so long its configuration parameters are set to undesired values by the underlying network protocol, and to avoid any potential disconnections or other negative effects that may result from long idle periods. In the example scenario of FIG. 3, the configuration parameters values that were set or adjusted for the connections are assumed to remain unchanged during the depicted sub-transfers; for example, if C1's window size was set to W1$b$ using priming packets, the window size remains at W1$b$ during sub-transfers S1-S6. (The response of traffic manager 170 to unacceptable performance and/or undesired changes to configuration parameters is described below in conjunction with the description of FIG. 4 for one embodiment.) In a first sub-transfer S1 of FIG. 3, C1-C4 are used for data transfer, with C5 and C6 held in reserve. In S2, the next sub-transfer in the sequence of sub-transfers, C2-C5 are used for data transfer, while C1 and C6 remain in reserve. Similarly, in the following sub-transfer S3, C3-C6 are in use, while C1 and C2 are spares, and so on. After six sub-transfers S1 through S6, the pattern is repeated, with the seventh sub-transfer using the same subset of connections as S1, the eight sub-transfer using the same subset of connections as S2, etc. In some embodiments, during a given sub-transfer, a plurality of packets may be sent over each in-use connection, while in other embodiments, only a single packet may be sent over each in-use connection during a given sub-transfer. By cycling through the connections as shown in FIG. 3, traffic manager 170 may ensure that each connection of the connection set is used fairly frequently with its configuration parameters maintained at their current values, and is not abandoned or closed as an "idle" connection by a networking protocol or application 120. By keeping a set of connections in reserve during each sub-transfer, traffic manager 170 may ensure that a quick and effective response to a performance problem and/or congestion on a particular in-use connection is detected as described below. It is noted that in some embodiments, all of the connections of a given connection set 150 may be used at least temporarily for some sub-transfers: e.g., for a particular sub-transfer, the selected subset of connections may include all available connections in the connection set.

Figure 4:
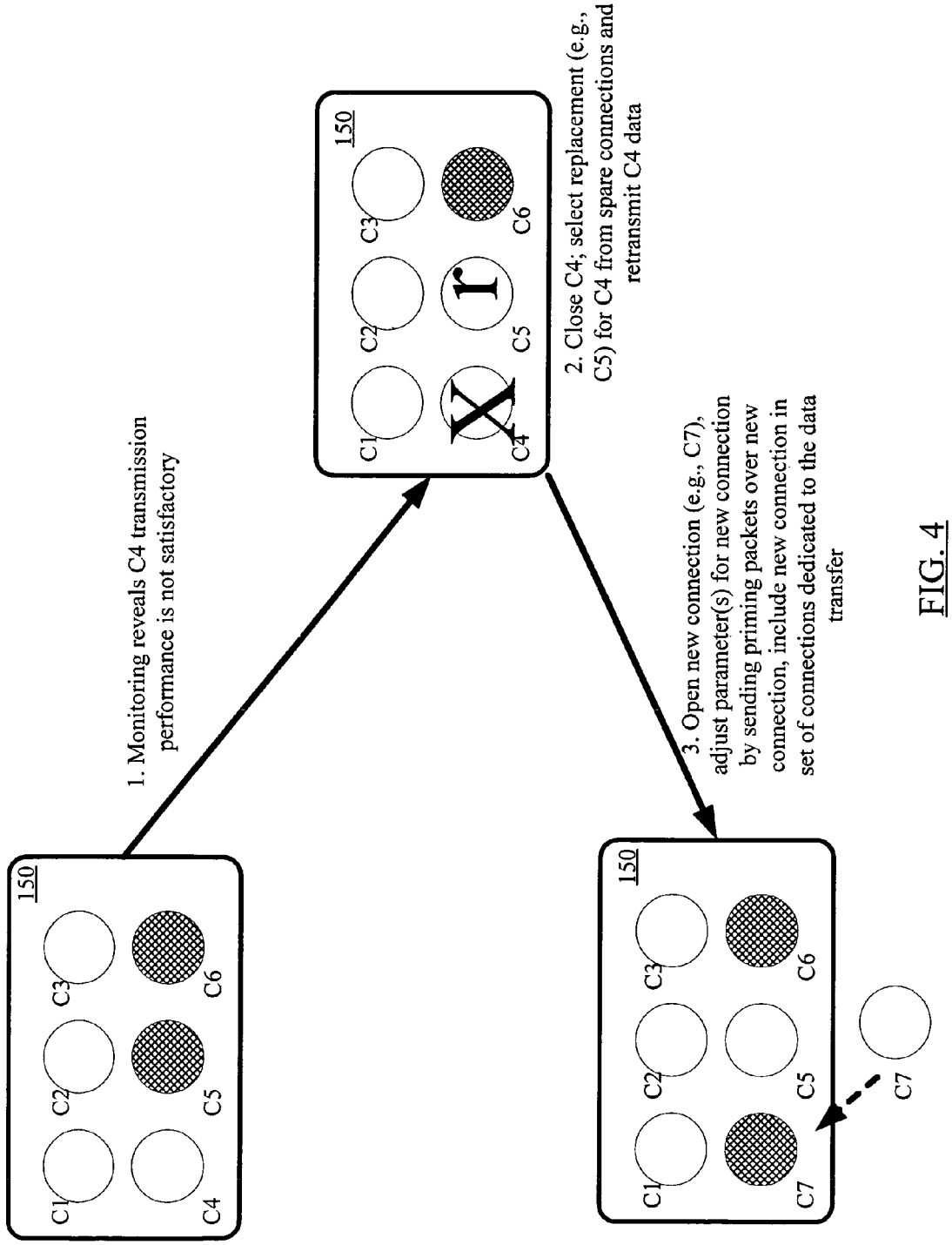
FIG. 4 is a block diagram illustrating aspects of the operation of a traffic manager in response to a detection of unsatisfactory performance and/or undesired configuration parameters for a particular connection during a sub-transfer, according to one embodiment.

FIG. 4 is a block diagram illustrating aspects of the operation of traffic manager 170 in response to a detection of unsatisfactory performance and/or undesired parameter values for a particular connection during a sub-transfer, according to one embodiment. In the depicted embodiment, the traffic manager 170 is configured to monitor the performance (e.g., round-trip response times and/or data transfer rates) over each of the connections used during a given sub-transfer. A variety of techniques may be used for monitoring per-connection performance in various embodiments, as described below in further detail. If, as shown in the section labeled "1" in FIG. 4, the traffic manager detects that performance over connection C4 is unsatisfactory, e.g., if a packet P transmitted over C4 takes longer to reach the destination than a desired threshold time, or if the packet P is dropped, the traffic manager may be configured to take one or more remedial actions. A connection over which performance is detected to be unsatisfactory may be termed an "unsatisfactory connection" herein. In one embodiment, the remedial actions may include closing the unsatisfactory connection (e.g., closing C4, as indicated by the large "X" in FIG. 4) and/or retransmitting one or more data packets that were previously sent on the unsatisfactory connection using one of the spare connections (e.g., retransmitting on C5, as indicated by the large "r" in FIG. 4). In addition, in one embodiment, a new connection (e.g., C7) may be established to replace the unsatisfactory connection in the pool. One or more configuration parameters for the new connection may be adjusted, e.g., by sending a priming packet or packets on the new connection, and the new connection may be included within the connection set to be used for the remaining part of the data transfer, as indicated in the portion of FIG. 4 labeled "3". In this way, an unsatisfactory connection (e.g., a connection on which temporary congestion, network misconfiguration, network device failure or link failure may have resulted in an undesirable setting of a transmit window size) may be rapidly discarded and replaced with a new connection primed for good performance, so that the throughput achieved for the bulk data transfer as a whole remains high. If, instead of employing the technique shown in FIG. 4, traffic manager were to instead wait for the networking protocol to "heal" the unsatisfactory connection using conventional protocol behavior (e.g., using congestion avoidance mode or a slow-start technique as described above) while the connection remains in use, throughput over the unsatisfactory connection may remain throttled for a while.

Remedial or corrective actions similar to those illustrated in FIG. 4 may be performed in some embodiments in response to a detection of an undesirable value of a configuration parameter associated with a connection, instead of or in addition to being performed when unsatisfactory performance is detected. For example, traffic manager 170 may be configured to monitor transmit window sizes for each connection in one embodiment, and may take one or more of the remedial actions if the transmit window size decreases below a threshold value on a particular connection, even if the performance achieved over a given connection remains satisfactory. An undesirable change to the parameter may indicate that even if the performance achieved thus far on the connection has been satisfactory, future performance is likely to be unsatisfactory. Thus, traffic manager 170 may be configured to take proactive action in such embodiments, e.g., by closing the connection with the undesirable parameter value and replacing it with a new primed connection in anticipation of future performance problems.

It is noted that in some implementations, if traffic manager 170 determines that all the packets sent over the unsatisfactory connection reached the destination, the retransmission indicated in FIG. 4 may not be performed. In other embodiments, variations of the technique of FIG. 4 may be implemented: e.g., in one embodiment, instead of immediately replacing the unsatisfactory connection with a new connection, the number of in-use connections for future sub-transfers may be reduced or increased either temporarily or until the bulk data transfer completes. It is noted that although FIG. 4 illustrates a response to a determination of unsatisfactory performance over one connection of a connection set, similar actions may be taken in some embodiments if performance over multiple connections is found to be unsatisfactory. For example, if two different connections are found to be unsatisfactory, in one embodiment, two spare connections may be used for respective retransmissions, both unsatisfactory connections may be closed, and two new connections may be set up and primed to replace the closed pair of connections.

Traffic manager 170 may be configured to make other types of modifications to the connection set 150 for a given bulk data transfer than those illustrated in FIG. 4 in some embodiments. For example, in one embodiment where traffic manager 170 starts with a default number of N connections in a connection set 150, of which M are to be used for each sub-transfer, the parameters M and/or N may be modified even if the performance over the existing connections remains satisfactory. If performance monitoring of the existing connections indicates that the network between the sending and receiving endpoints 110 appears to be relatively lightly utilized, for example, either M alone or both M and N may be increased to further increase overall throughput for the bulk data transfer. If conditions in the network again change, e.g., if performance monitoring after the increase in M and/or N indicates that the attempted overall throughput for the bulk data transfer exceeds the available bandwidth, the parameter values may be lowered until a transfer rate that is sustainable is achieved. In some embodiments, traffic manager 170 may be configured to wait for a specified period or a specified number of sub-transfers before making adjustments to M and/or N based on performance monitoring results, so that, for example, the effects of outlying data points in the performance monitoring results are moderated, and monitoring results aggregated over several measurement periods are used to modify bulk data transfer parameters.

Traffic manager 170 may be configured to obtain separate estimates or measurements of the performance achieved over each connection of connection set 150 in some embodiments. In one embodiment, traffic manager 170 may be configured to instrument one or more packets sent over each connection, for example to obtain real-time performance metrics such as estimates of end-to-end available bandwidth and/or round-trip transmission times for the connection. The term "end-to-end bandwidth", as used herein, refers to the rate at which data associated with the bulk data transfer is transmitted over a given connection, taking the entire network path between the endpoints into account. It is noted that the end-to-end bandwidth, as measured at a given endpoint 110, may differ from the advertised or achieved bandwidth at individual components of the network path between endpoints. For example, an Ethernet network interface card used to transmit the data from endpoint 110A may have an advertised bandwidth of 100 Megabits/second or one Gigabit/second; various network devices, such as switches, may offer advertised aggregate bandwidths of several Gigabits/second; and links 140 may each have their own associated advertised bandwidth capacity. The actual bandwidth achieved from endpoint to endpoint may be substantially less than the advertised bandwidth of even the slowest device or link of the network path for a variety of reasons in different implementations. For example, several of the network devices 130 and/or links 140 may be shared among multiple tasks of a given application 120, between multiple applications 120, and/or between multiple endpoints 110. Concurrent use of the devices 130 may result in queuing and/or packet collisions at various points along the path, depending on the specific implementations of the devices 130 and the networking protocol or protocols in use. Temporary congestion at network devices 130 and/or over network links 140 resulting from bursty send traffic patterns may also reduce available end-to-end bandwidth as described earlier. In some embodiments, the specific performance metrics to be measured or estimated, as well as threshold values used to determine whether a particular connection is unsatisfactory or not, may be specified via parameters supplied to traffic manager 170 by applications 120 and/or users. By monitoring the performance over each connection in real time and rapidly taking responsive actions (such as actions illustrated in FIG. 4), traffic managers 170 may quickly adjust the characteristics of bulk data transfers to adapt to changing network conditions, e.g., without necessarily relying on the underlying network protocols to gradually "heal" congested connections, and without incurring some of the retransmission-related overhead described above.

Figure 5:
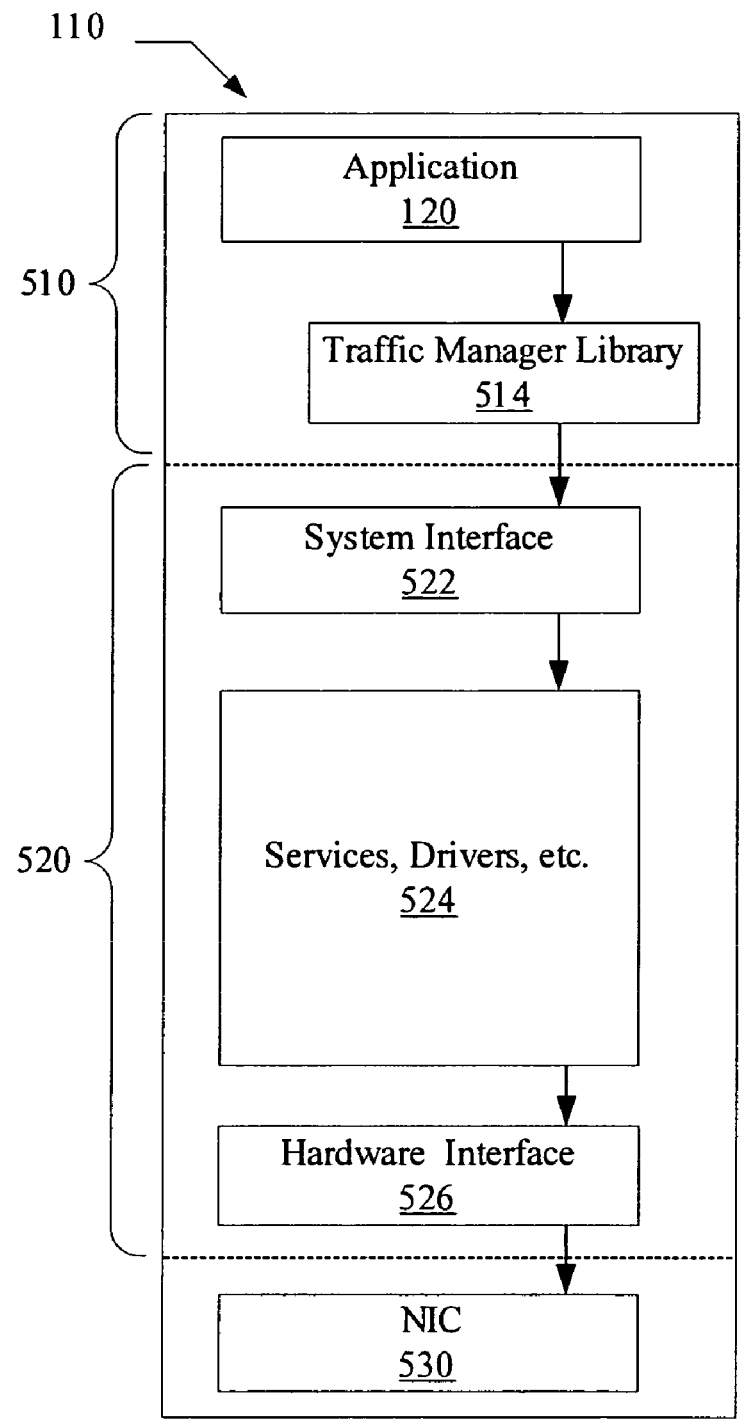
FIG. 5 is a block diagram illustrating an abstracted view of a sending endpoint showing various hardware and software components, according to one embodiment.

In various embodiments, one or more components of a traffic manager 170 may be implemented at various levels of a software stack at an endpoint 170. FIG. 5 is a block diagram illustrating an abstracted view of a sending endpoint 110 showing various hardware and software components, with the software components operating within either a user space 510 or a kernel space 520, according to one embodiment. In the illustrated embodiment, the endpoint 110 may be configured to support communications using TCP/IP. Alternative embodiments may support other communication protocols in addition to TCP/IP or instead of TCP/IP.

In the embodiment shown in FIG. 5, the user space 510 may include application 120 and a traffic manager library 514 implementing the functionality of traffic manager 170. For example, traffic manager library 514 may be configured to set up connection sets 150 for bulk data transfer on behalf of application tasks, instrument packets to estimate or measure performance metrics, organize sub-transfers, and respond to detections of unsatisfactory connections as described above. While multiple applications 120 and traffic manager libraries 514 may be included in a given endpoint 110, only a single application 120 and library 514 are shown for ease of discussion. In one embodiment, traffic manager library 514 may comprise a dynamically linked library (DLL) that includes code to support network communications. In one embodiment, library 514 may be loaded prior to a communication socket library on a per process basis. For example, library 514 may provide an Application Programming Interface (API) for accessing communication services provided by the operating system, such as a modified version of a socket API that is invoked in lieu of the original socket API included in the operating system. While the term "library" is used herein to refer to software component 514, this term is not intended to restrict the traffic manager to a particular type of software component. For example, as described above, library 514 may be a DLL. However, the functions performed by the code within the library may be performed by code within the application 120 itself, in a network filter driver, in a different software component, or elsewhere.

Kernel space 520 may include a system interface 522, services 524, and hardware interface 526. System interface 522 may provide an interface between the operating system services 524 and application code within the user space 510. Services 524 may include, for example, protocol stacks, drivers, and other facilities commonly found in an operating system. Hardware interface 526 may include code that provides an interface between the operating system and hardware components of the endpoint 110, such as network interface card (NIC) 530. Outbound traffic corresponding to a given task of application 120 originates at the application 120, and proceeds down the layers of components illustrated in FIG. 5 on its way to network 115. Various operations may be performed on the traffic as it flows down the stack. For example, traffic manager library 514 may partition the data into slices for the various connections to be used in parallel, and instrument data packets generated by the application prior to transferring the application data to the kernel layer 520. The data packets may be buffered at various software layers and/or at the NIC 530, and packet headers may be added or modified at various layers as well in accordance with the specific networking protocol in use. Software and hardware components similar to those illustrated in FIG. 5 may be present at the receiving endpoint of the data transfer, where the incoming packets may be handed up the stack until the data reaches a receiving application. The receiving endpoint may also include a traffic manager library 514. The receiving traffic manager library may be configured to manage outbound bulk data transfers from the receiving endpoint, and may also be configured to cooperate with the sending endpoint's traffic manager library, e.g., to include timestamps in packets sent back to the sending endpoint to help measure or estimate end-to-end available bandwidth.

Figure 6:
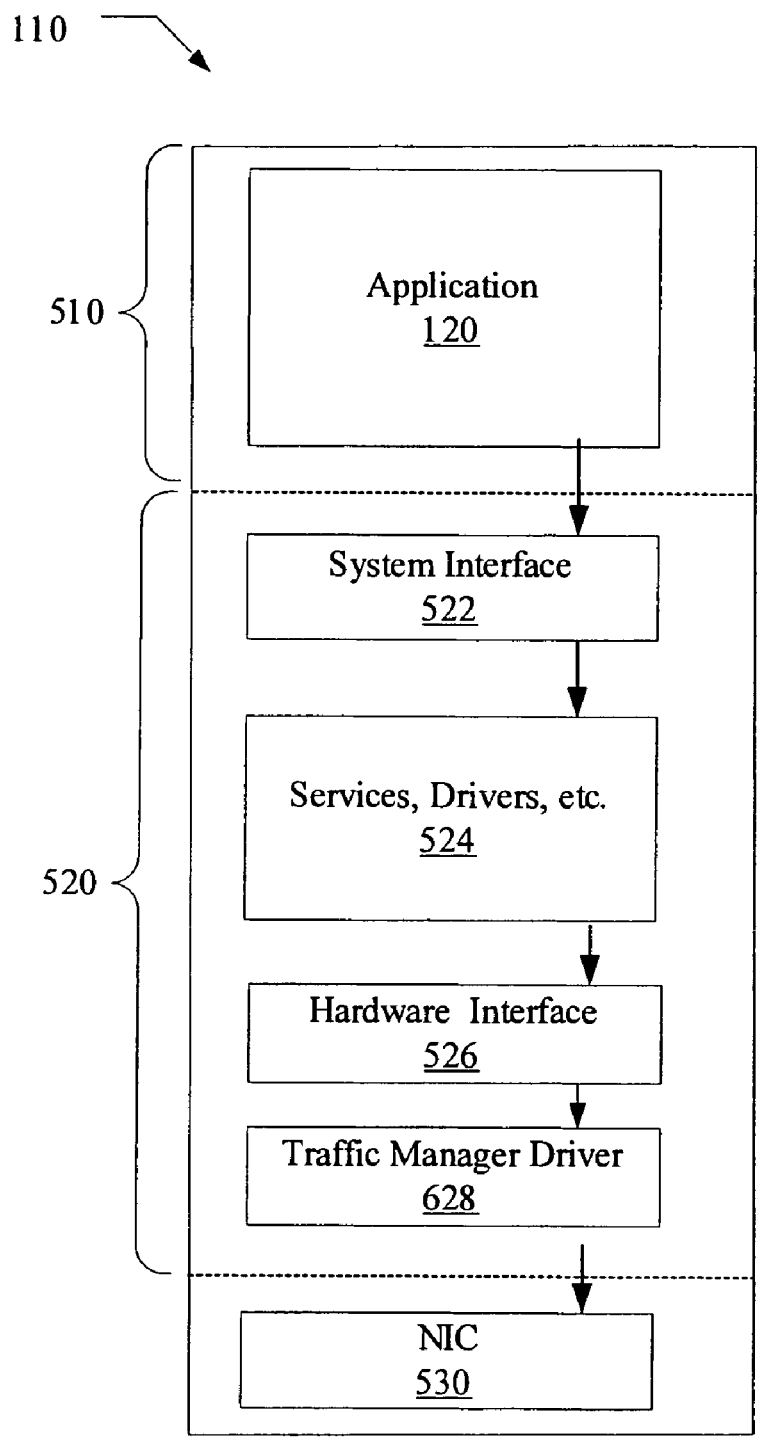
FIG. 6 is a block diagram illustrating various components of a sending endpoint according to an embodiment in which a kernel-space traffic manager driver implements at least part of the functionality of a traffic manager.

In the embodiment illustrated in FIG. 5, the functionality of traffic manager 170 may be accomplished entirely in user space; without affecting either the kernel space software stack (including the networking software stack) or the application 120. In alternative embodiments, at least some of the functionality of traffic manager 170 may be implemented in kernel space. FIG. 6 is a block diagram illustrating various components of a sending endpoint 110 according to an embodiment in which a kernel-space traffic manager driver 628 implements at least part of the functionality of traffic manager 170. Several of the components of endpoint 110 shown in FIG. 5 are present in FIG. 6 as well, such as application 120, system interface 522, services and drivers 524, hardware interface 526 and NIC 530. In one embodiment, traffic manager driver

628 may be configured to monitor per-connection performance, e.g., with the help of instrumentation introduced into the data packets before they are transferred to the NIC 530. As in the case of the embodiment of FIG. 5, no code changes may be required in the application or in the operating system or networking stack to implement the functionality of traffic manager driver 628 in some embodiments. A similar traffic manager driver 628 may be included at receiving endpoints 110 in some embodiments. It is noted that while FIG. 5 and FIG. 6 illustrate two exemplary layers of an endpoint's software stack at which functionality of traffic manager 170 may be implemented, in other embodiments traffic manager functionality may be implemented at any layer or at any combination of various layers of an endpoint software stack. In one embodiment, kernel-level and user-level components of traffic manager 170 may coexist at the same endpoint, and the different components may be configured to cooperatively perform the functionality of the traffic manager.

Figure 7:
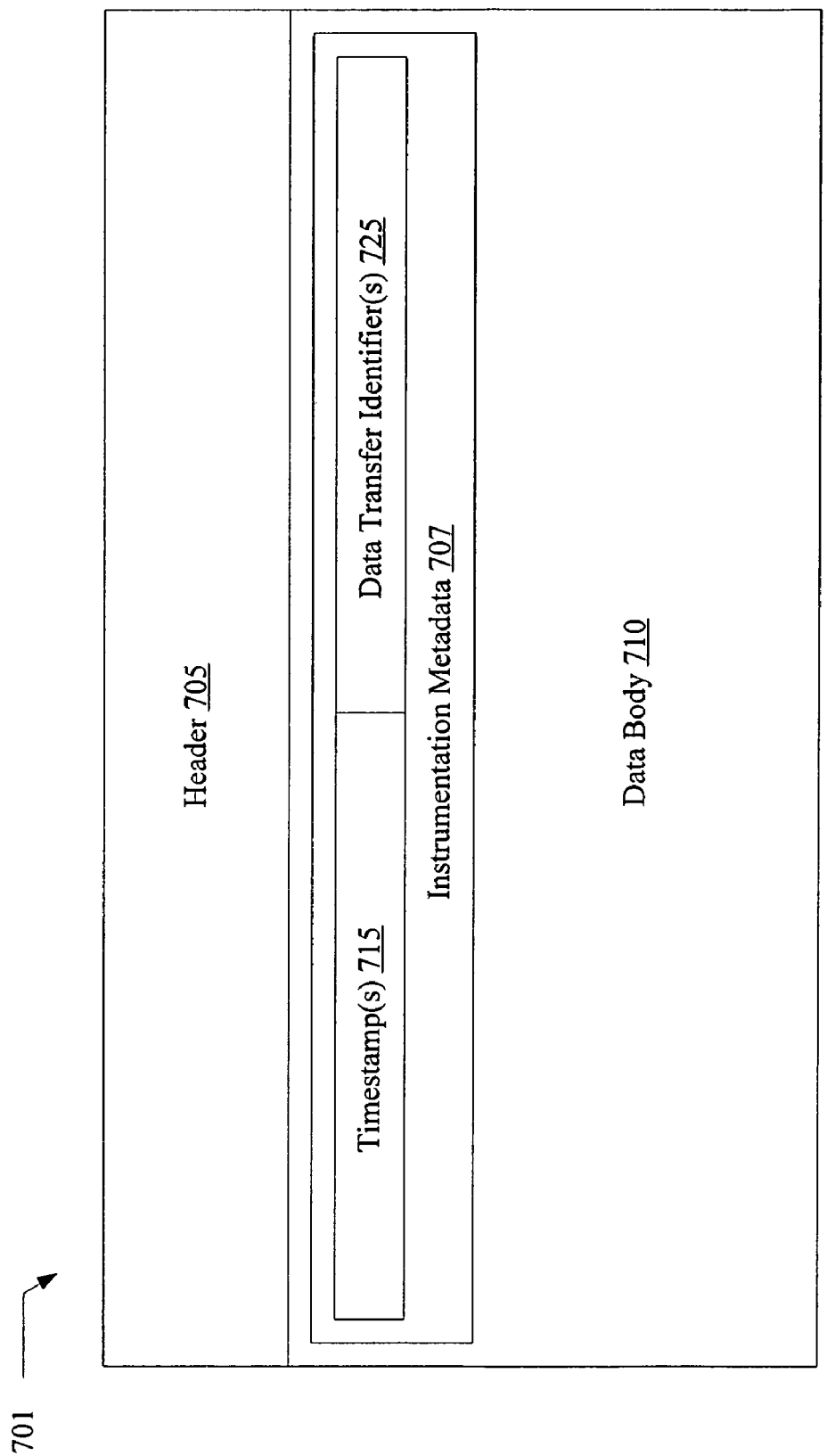
FIG. 7 is a block diagram illustrating contents of an exemplary packet instrumented by a traffic manager, according to one embodiment.

In one embodiment, a traffic manager 170 may be configured to insert timestamps and/or data transfer identifiers into the packets of a data transfer, e.g., in order to obtain per-connection performance estimates. FIG. 7 is a block diagram illustrating contents of an exemplary packet 701 instrumented by a traffic manager 170, according to one embodiment. As shown, the packet 701 may comprise a header 705 and a data body 710. The header 705 may comprise a number of fields, such as a destination address, a checksum, etc., that may for example be generated by various layers of a networking software stack. The data body 710 may include a portion of the application data corresponding to the data transfer, as well as instrumentation metadata 707 comprising one or more timestamps 715 and data transfer identifiers 725 inserted by a traffic manager 170. In some implementations, the instrumentation metadata 707 may be inserted into an otherwise unused portion of the packet (such as a padding region used to ensure that the packets have a minimum or standard size according to the networking protocol being used). A data transfer identifier 725 may be used to uniquely identify a given data transfer, e.g., to help separately monitor the performance achieved for each data transfer over a given connection. In one embodiment, a traffic manager 170 at a sending endpoint (which may be referred to herein as a "sending traffic manager") may be configured to generate a new unique identifier for each application task that is initiated, and use the generated identifier to identify the data packets corresponding to the application task. In some embodiments, the sending traffic manager may insert a timestamp 715 (indicating the current time at the sender) and/or the data transfer identifier 725 into the data body 710 at the time that the data of the packet 701 is transferred from user space to kernel space, while in other embodiments, the timestamp and/or identifier may be inserted at other times during the passage of the packet down the sending endpoint's software stack (e.g., just before the packet is transferred to a NIC). In one embodiment, a traffic manager 170 at a receiving endpoint (referred to herein as a "receiving traffic manager") may be configured to send a receive timestamp indicating when the packet is received at the receiving endpoint, along with the original timestamp and the data transfer identifier back to the sending traffic manager (e.g., as part of a data body of an acknowledgement packet sent from the receiving endpoint). Using the receive timestamp, the original timestamp, and the data transfer identifier, the sending traffic manager may be able to compute a round-trip time and/or an estimate of the bandwidth currently available for the outbound data transfer over the connection, and use the computed value or values in determining whether the connection is providing satisfactory performance or not. In some embodiments, the traffic manager 170 at a sending endpoint may be configured to synchronize clocks with a traffic manager at a receiving endpoint in order to ensure that the timestamps 715 provided by both sides of the data transfer provide accurate indications of the time taken to transfer a packet.

A number of variations of the basic timestamp-based technique described above may be used in various embodiments. For example, in one embodiment, only a subset of the packets sent on a given connection may be instrumented: e.g., every fifth packet or every tenth packet may be instrumented by the sending traffic manager 170, and corresponding acknowledgements from the receiving traffic manager may be used to estimate connection performance. In another embodiment, instead of modifying packets that contain application data, the sending side traffic manager 170 may send special diagnostic packets from time to time to the receiving endpoint to help estimate the available bandwidth. The priming packets described above may also be used to measure or estimate connection performance in some embodiments: e.g., if the priming packets sent on a connection themselves indicate unsatisfactory performance, the connection may be closed before it is used for the bulk data transfer. The special diagnostic packets may not contain application data in some embodiments: instead, the data bodies of the diagnostic packets may contain, e.g., control information about the data transfer and or padding inserted to make the packet reach a desired size. In one implementation, instead of sending a receive timestamp in an acknowledgment, the receiving traffic manager may send its estimates of the transmission time for the packet and or its estimates of the available bandwidth back to the sending traffic manager. The instrumentation metadata 707 may in some embodiments include different fields than those shown in FIG. 7: e.g., in one implementation, additional fields such as sequence numbers may be included in the metadata, while in other implementations, data transfer identifiers may be omitted.

Figure 8:
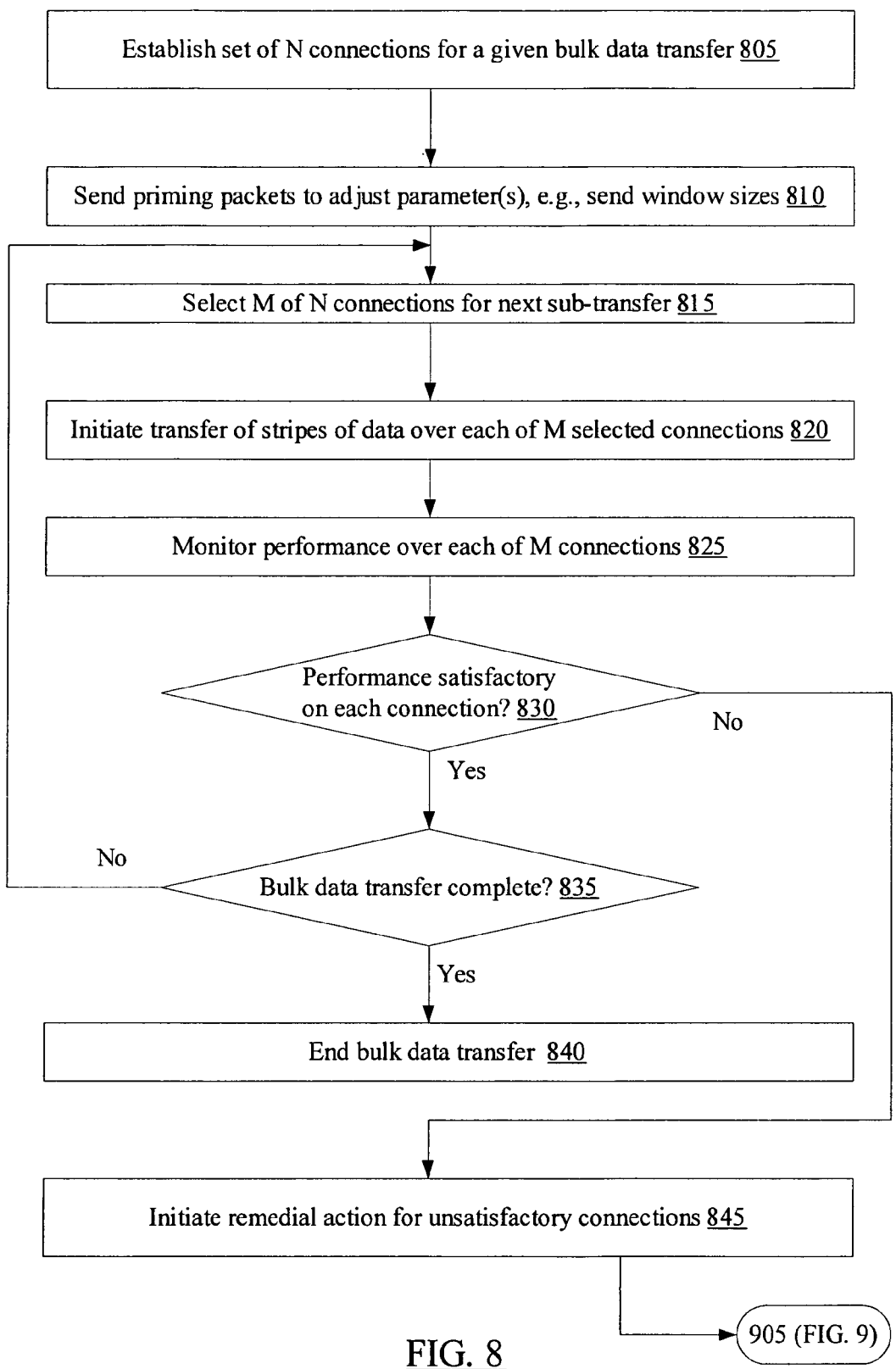
FIG. 8 is a flow diagram illustrating aspects of the operation of a sending traffic manager at an endpoint, according to one embodiment.

FIG. 8 is a flow diagram illustrating aspects of the operation of a sending traffic manager 170 at an endpoint 110, according to one embodiment. As shown in block 805, the traffic manager 170 may be configured to establish a connection set 150 comprising N connections for a given bulk data transfer on behalf of an application 120. The traffic manager may then adjust one or more parameters (such as window sizes) for each of the connections, e.g., by sending one or more priming packets over each of the connections (block 810). The priming packets may, for example, comprise relatively small packets whose payloads consist largely of garbage or padding bytes, or may comprise metadata to be shared with the receiving endpoint 110. In one implementation, one or more of the priming packets may contain a portion of the application data of the data transfer—e.g., the payloads of the priming packets may actually be used to initiate the data transfer itself, in addition to being used to adjust parameters such as window sizes. In some embodiments, the traffic manager 170 may be configured to determine the values of the parameter or parameters being adjusted as the priming packets are sent, e.g., to detect when appropriate values for the parameters have been achieved, indicating that no further priming packets need to be sent. A querying API supported by a networking software stack at the sending endpoint, or some other monitoring capability, may be used to keep track of the parameter values of interest. In other embodiments, the traffic manager 170 may be configured to send a particular number of priming packets in a best effort to adjust the parameter or parameters, without necessarily tracking the values of the parameters as they change.

Traffic manager 170 may then initiate a sequence of sub-transfers using the primed connections (i.e., connections whose parameters have been appropriately adjusted) to send the application data to the receiving endpoint 110. For each sub-transfer, M of the N connections in the connection set 150 may be used in some embodiments, leaving (N-M) "spare" connections with their parameters set appropriately for the bulk data transfer. As described above in conjunction with the description of FIG. 3, the specific subset of M connections to be used for a next sub-transfer may be selected (block 815) in such a manner that all N connections are re-used fairly quickly in some implementations, e.g., by using a round-robin selection technique to rotate the roles of "spare" and in-use connections in successive sub-transfers. In one implementation, the sending traffic manager 170 may initiate a sub-transfer before all the connections in the connection set have been fully primed: e.g., if transmit window sizes of six connections have to be adjusted, the data transfer may be begun as soon as the first of the six connections reaches the desired window size, without waiting for all six connections to reach the desired window sizes. The application data to be transferred may be subdivided or partitioned into segments or stripes, and one or more stripes (e.g., consecutive stripes) may be transmitted over each connection during a given sub-transfer (block 820). For example, in one implementation where connection set 150 includes six connections C1-C6 of which four are to be used during each sub-transfer (i.e., N=6 and M=4), and the data of a file to be transferred is divided into a sequence of stripes S1-Sp, the following mapping of stripes to connections may occur during the first sub-transfer in one embodiment: S1 may be sent over C1, S2 over C2, S3 over C3, and S4 over C4, with C5 and C6 kept as spare connections. In some embodiments, the traffic manager at the sending endpoint may be configured to partition the application data into the stripes, and a traffic manager at the receiving endpoint may be configured to recombine the stripes in the correct order for the receiving application 120. In other embodiments, the tasks of partitioning application data at the sending endpoint and/or recombining the striped data at the receiving endpoint may be performed by entities external to the traffic manager.

In the embodiment depicted in FIG. 8, the sending traffic manager 170 may be configured to monitor performance over each of the connections being used for a given sub-transfer (block 825), e.g., using the user-mode and/or kernel-mode instrumentation described above. If the performance over any of the connections is found to be unsatisfactory (as determined in decision block 830), remediation actions may be initiated for one or more of the unsatisfactory connections (block 845). Further details regarding the remediation actions are provided below in conjunction with the description of FIG. 9. Various criteria and/or metrics may be used to determine whether the performance over a given connection is satisfactory or not in different embodiments—e.g., in one embodiment, round-trip time for messages may be used as the determining criterion, and in another embodiment, the send time (i.e., time taken for the data to reach the receiver) alone may be used. If the performance over all the connections is found to be satisfactory, traffic manager 170 may be configured to determine whether additional data remains to be transferred for the current application task (block 835). The bulk data transfer may be terminated (block 840) if no additional data remains, e.g., the connections of the connection set may be closed and other resources being used for the bulk data transfer may be freed.

If additional data remains to be transferred for a given bulk data transfer (as determined in block 835), the sending traffic manager 170 may perform additional sub-transfers, e.g., repeating operations corresponding to blocks 815-830 until the bulk data transfer is complete. Continuing the example with N=6 and M=4, for which mappings of the first four data stripes to connections were shown above, the following mappings may be used during the second sub-transfer: S5 may be sent over C2, S6 over C3, S7 over C4, and S8 over C5, with C6 and C1 kept as spare connections As noted earlier, the parameters M and/or N may be modified from one sub-transfer to another even if unsatisfactory performance is not detected: e.g., if the traffic manager detects that the network is relatively underutilized, it may increase the number of active connections used for one or more sub-transfers and monitor the resulting performance. As the traffic manager 170 gradually modified the parameters of the bulk data transfer in response to monitored performance, steady state values of M and N may be eventually be reached in such embodiments, at which point the network is optimally utilized to provide the maximum sustainable throughput without causing congestion.

Any of a number of variations of the techniques illustrated in FIG. 8 may be employed in different embodiments. In some embodiments, especially for example if traffic manager 170 detects frequent bulk data transfers between a particular pair of endpoints 110, instead of establishing connections at the start of a bulk data transfer and closing the connections when the bulk data transfer is complete, the traffic manager 170 may maintain a persistent connection pool for sharing between different application tasks at the two endpoints. When a given bulk data transfer is to be initiated, N connections may be allocated from the pool, primed using priming packets if necessary, and sub-transfers using M of the N connections each may be performed; at the end of the given bulk data transfer, the N connections may be returned to the persistent connection pool. The sending traffic manager may act as a sending proxy in such an embodiment, e.g., receiving application data from a variety of application tasks for one or more applications 120 at the sending endpoint and transmitting stripes of the application data in parallel as described above, and the receiving traffic manager may act as an aggregator (e.g., the entity responsible for combining transmitted data stripes) and distributor of the data to applications 120 at the receiving endpoint. The overhead of opening and closing connections may be further reduced in such embodiments employing persistent connection pools. In another variation, in some embodiments, the connections of a given connection set 150 may be shared among multiple application tasks. For example, two different tasks (such as file transfers) of the same application may share a connection set in one embodiment, and tasks of different applications may share a connection set in other embodiments.

Figure 9:
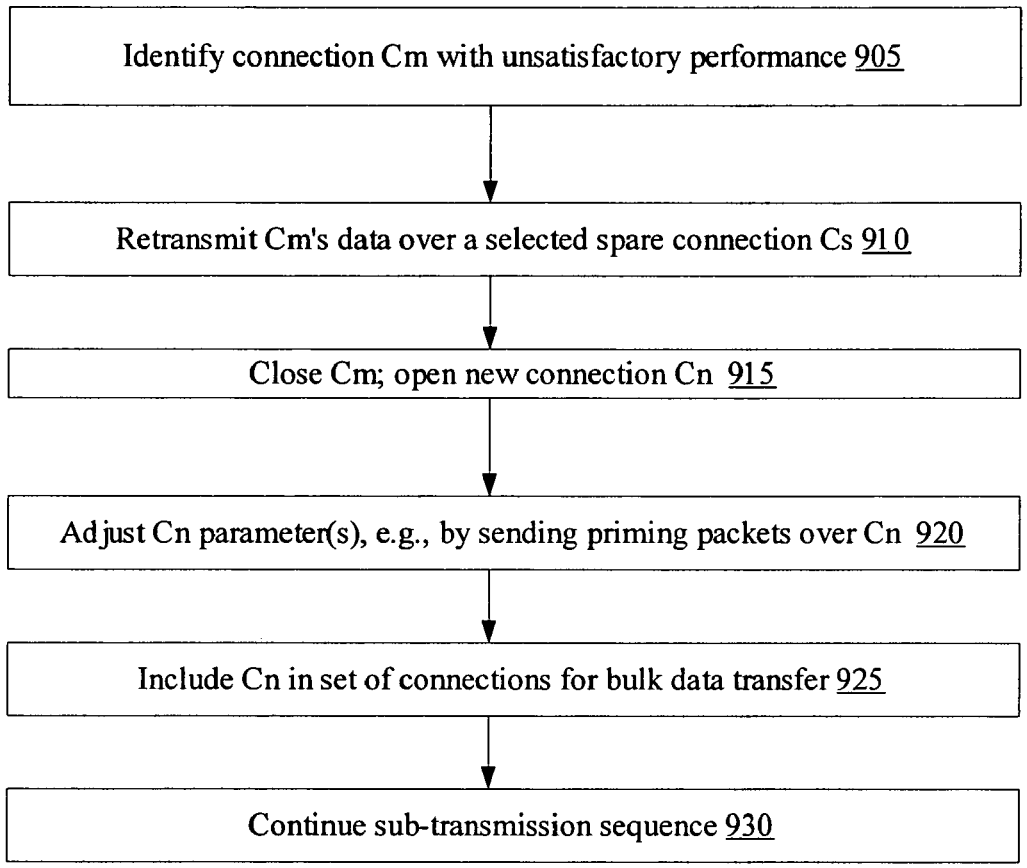
FIG. 9 is a flow diagram illustrating aspects of the operation of a sending traffic manager during remedial actions taken in response to a detection of unsatisfactory performance, according to one embodiment.

FIG. 9 is a flow diagram illustrating aspects of the operation of a sending traffic manager 170 during remedial actions taken in response to a detection of unsatisfactory performance, according to one embodiment. As indicated in block 845 of FIG. 8, remedial actions may be initiated if monitoring indicates that performance over one or more of the connections used for a sub-transfer is not satisfactory. The traffic manager 170 may use the monitoring results to identify a particular connection, e.g., "Cm", with unsatisfactory performance (block 905). From among the spare connections of the connection set 150 (i.e., the connections that were not used during the sub-transfer in which the unsatisfactory performance was detected), a particular spare connection Cs may be selected for retransmission. The data transmitted over Cm may be retransmitted over Cs (block 910). In addition, Cm may be closed and a new connection Cn may, be opened to replace Cm in the connection set (block 915). One or more parameters, such as transmit window size, of the newly opened connection Cn may be adjusted, e.g., by sending priming packets over Cn (block 920). Cn may be included in the connection set 150 (block 925) in use for the current bulk data transfer, and the sequence of sub-transfers may be continued (block 930). It is noted that in various embodiments, at least some of the operations illustrated in FIG. 9 may be performed in a different order or may be omitted entirely. For example, in one embodiment, traffic manager 170 may not retransmit the data that was sent over the unsatisfactory connection Cm, e.g., if it is determined that the data reached the receiving endpoint; thus, the operations corresponding to block 910 may be omitted in such an embodiment. In another embodiment, instead of immediately opening a new connection Cn, the number of spare connections may be temporarily reduced by traffic manager 170, and a new connection Cn may only be added to connection set 150 if and when further monitoring indicates that such an addition would help improve overall performance. Some or all of the remedial actions illustrated in FIG. 9 may be taken in response to detecting that a configuration parameter associated with a connection has reached an undesirable value in some embodiments, instead of or in addition to being taken in response to unsatisfactory performance.

In some embodiments, one or more input parameters may be used to control aspects of the operation of a traffic manager 170. Stripe sizes (e.g., the maximum or minimum amount of application data to be transmitted over a connection during a given sub-transfer) may be specified via input parameters in one embodiment. Threshold performance metric values (e.g., a maximum round-trip delay or a minimum throughput) to be used in determining whether performance over a given connection is satisfactory or not may be indicated by input parameters in another embodiment. In one implementation, an input parameter may be used to specify how closely traffic manager 170 should attempt to match available bandwidth for a given application's data transfers or for a particular data transfer, e.g., by modifying the number of connections in use during sub-transfers. If the input parameter indicates that the traffic manager 170 should be aggressive and attempt to maximize throughput as much as possible, the parameters M and/or N of FIG. 8 may be increased relatively quickly in response to monitoring results. If the input parameter indicates that the traffic manager should not be as aggressive in maximizing throughput, the traffic manager 170 may be configured to adapt M and/or N more gradually. Parameters may also be used to indicate relative priorities of different applications or different tasks (which may then be used by the traffic manager 170 to set larger or smaller values for M and/or N for the different applications or tasks), the minimum durations of monitoring periods to use before modifying M and/or N, etc., in various embodiments. Parameters may also be used to control various other aspects of the operation of traffic manager 170, such as whether packets containing application data are to be instrumented or whether diagnostic packets are to be used instead to monitor performance for each connection. Input parameters for traffic manager 170 may be specified via any of a variety of interfaces in various embodiments, such as a graphical user interface (GUI), one or more parameter files, environment variables, command-line options, etc.

Figure 10:
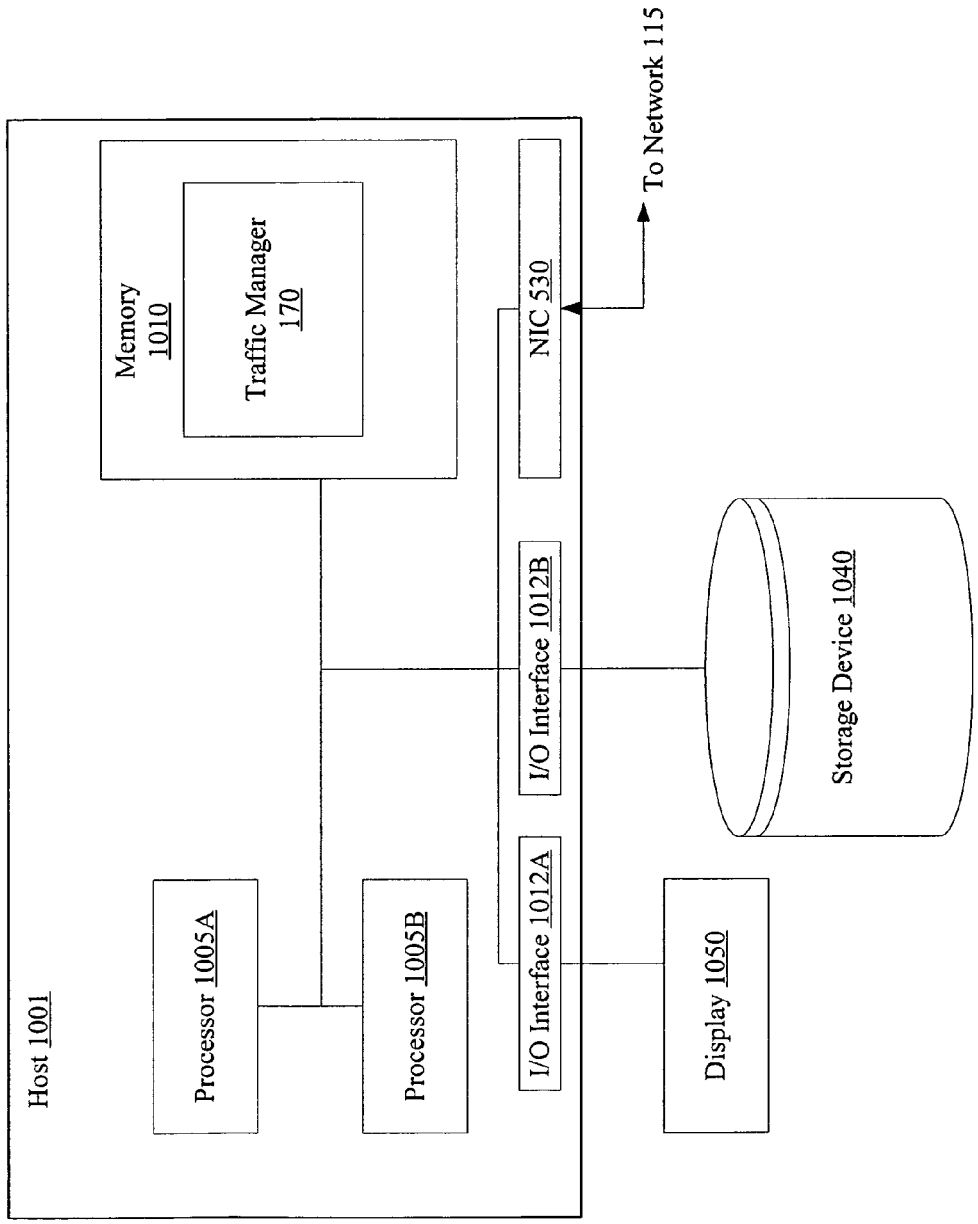
FIG. 10 is a block diagram of a computer host that may be used as an endpoint, according to one embodiment.

FIG. 10 is a block diagram of a computer host 1001 that may be used as an endpoint 110 (e.g., either as a sending endpoint or a receiving endpoint), according to one embodiment. As shown, host 1001 may include one or more processors 1005, such as processors 1005A and 1005B. In various embodiments, processors 1005 may be implemented using any desired architecture or chip set, such as the SPARC™ architecture from Sun Microsystems or the x86-compatible architectures from Intel Corporation, Advanced Micro Devices, etc. Program instructions that may be executable to implement part or all of the functionality of traffic managers 170 may be partly or fully resident within a memory 1010 at a given point in time, and may also be stored on a storage device 1040. Memory 1010 may be implemented using any appropriate medium such as any of various types of RAM (e.g., DRAM, SDRAM, RDRAM, SRAM, etc.). In addition to processors 1005 and memory 1010, host 1001 may also include one or more I/O interfaces 1012, such as I/O interface 1012A to a display device 1050, I/O interface 1012B providing access to storage devices 1040, one or more network interface cards (NICs) 530 providing access to a network 115, and the like. Display device 1050 may be used, for example, to display one or more of the user interfaces provided by traffic manager 170 to specify input parameters described above. Any desired open and/or proprietary networking protocol or protocols may be used in network 115 in various embodiments, such as TCP/IP, Asynchronous Transfer Mode (ATM), AppleTalk, Systems Network Architecture (SNA) etc. Any of a variety of storage devices 1040 may be used to store the instructions as well as data for traffic manager 170 in different embodiments, including any desired type of persistent and/or volatile storage devices, such as individual disks, disk arrays, tape devices, optical devices such as CD-ROMs, CD-RW drives, DVD-ROMs, DVD-RW drives, flash memory devices, various types of RAM and the like. One or more storage devices 1040 may be directly coupled to host 1001 in some embodiments (e.g., using the Small Computer Systems Interface (SCSI) protocol), or may be accessible over any desired storage interconnect such as a fiber channel fabric or storage area network (SAN) in other embodiments.

In addition to traffic manager 170, memory 1010 and/or storage devices 1040 may also store operating systems software and/or software for various applications 120 in various embodiments. In some embodiments, part or all of traffic manager 170 may be included an operating system, a storage management software product or another software package, while in other embodiments, traffic manager 170 may be packaged as a standalone product. In some embodiments, the component modules of a traffic manager 170 may be distributed across multiple hosts 1001, or may be replicated at a plurality of hosts 1001. In one embodiment, part or all of the functionality of traffic manager 170 may be implemented via one or more hardware devices (e.g., via one or more Field Programmable Gate Array (FPGA) devices) or in firmware. It is noted that in addition to or instead of computer hosts, in some embodiments endpoints 110 linked to network 115 may include a variety of other devices configured to implement applications 120 and traffic managers 170, such as television set-top boxes, mobile phones, intelligent stereo devices, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   one or more processors; and
   memory coupled to the one or more processors, wherein the memory comprises program instructions executable by the one or more processors to:
      establish a plurality of network connections designated to be used for a bulk transfer;

adjust one or more configuration parameters associated with each network connection of the plurality of network connections, wherein to adjust the one or more configuration parameters, the instructions are further executable to send one or more priming packets associated with the bulk data transfer over each network connection to generate a plurality of primed network connections;

perform the bulk transfer as a sequence of sub-transfers, wherein each sub-transfer includes a transmission of a predetermined amount of the data over each primed network connection of a selected subset of the plurality of primed network connections, wherein a reserved subset of the plurality of primed network connections are not initially used in performing the bulk transfer as the sequence of sub-transfers;

determine whether data transmission over each respective network connection selected for a corresponding sub-transfer of the sequence of sub-transfers meets a threshold performance criterion; and in response to determining that the data transmission over a respective one of the network connections does not meet the threshold performance criterion, automatically determine that the respective one of the network connections is an unsatisfactory connection and automatically retransmit at least a portion of the corresponding sub-transfer over one of the primed network connections of the reserved subset of the plurality of primed network connections.

2. The system as recited in claim 1, wherein the one or more configuration parameters associated with a network connection of the plurality of network connections include a parameter indicative of an allowed amount of unacknowledged data on the network connection.

3. The system as recited in claim 1, wherein the one or more configuration parameters associated with a network connection of the plurality of network connections include a transmit window size.

4. The system as recited in claim 1, wherein to adjust the one or more configuration parameters, the instructions are further executable to:
determine, after sending a particular priming packet of the plurality of priming packets, whether a particular configuration parameter of the one or more configuration parameters has reached a predetermined setting;
if the particular configuration parameter has not reached the predetermined setting, send an additional priming packet over the network connection; and
if the particular configuration parameter has reached the predetermined setting, determine that no additional priming packets are to be sent over the network connection.

5. The system as recited in claim 1, wherein the sequence of sub-transfers includes a particular sub-transfer followed by another sub-transfer, wherein the subset of primed network connections selected for the particular sub-transfer differs from the subset of primed network connections selected for the another data transfer.

6. The system as recited in claim 1, wherein the instructions are further executable to:
in response to determining that the data transmission over the respective one of the network connections does not meet the threshold performance criterion,
close the respective one of the network connections;
open an additional network connection;
adjust one or more configuration parameters associated with the additional network connection, wherein said adjusting comprises sending one or more priming packets over the additional network connection; and
designate the additional network connection to be included in a set of network connections to be used to implement a remainder of the bulk transfer.

7. The system as recited in claim 1, wherein the threshold performance criterion comprises a time taken to transmit a packet from a sender to a receiver over each respective network connection.

8. The system as recited in claim 1, wherein to determine whether the data transmission over each respective network connection meets the threshold performance criterion, the instructions are further executable to:
insert instrumentation data into a packet transmitted over each respective network connection.

9. The system as recited in claim 8, wherein said instrumentation data is inserted using a user-mode software module, without modifying a networking software stack in use for each respective network connection.

10. The system as recited in claim 1, wherein the instructions are further executable to:
partition data corresponding to the bulk transfer into a plurality of stripes of a predetermined transmission stripe size; and
transmit consecutive stripes on each of two or more primed network connections selected for a given sub-transfer of the sequence of sub-transfers.

11. A computer-implemented method, comprising:
establishing a plurality of network connections designated to be used for a bulk transfer;
adjusting one or more configuration parameters associated with each network connection of the plurality of network connections, wherein said adjusting comprises sending one or more priming packets associated with the bulk data transfer over each network connection to generate a plurality of primed network connections;
performing the bulk transfer as a sequence of sub-transfers, wherein each sub-transfer includes a transmission of a predetermined amount of the data over each primed network connection of a selected subset of the plurality of primed network connections, wherein a reserved subset of the plurality of primed network connections are not initially used in performing the bulk transfer as the sequence of sub-transfers;
determining whether data transmission over each respective network connection selected for a corresponding sub-transfer of the sequence of sub-transfers meets a threshold performance criterion; and
in response to determining that the data transmission over a respective one of the network connections does not meet the threshold performance criterion, automatically determining that the respective one of the network connections is an unsatisfactory connection and automatically retransmitting at least a portion of the corresponding sub-transfer over one of the primed network connections of the reserved subset of the plurality of primed network connections.

12. The method as recited in claim 11, wherein said adjusting comprises:
determining, after sending a particular priming packet of the plurality of priming packets, whether a particular configuration parameter of the one or more configuration parameters has reached a predetermined setting;
if the particular configuration parameter has not reached the predetermined setting, sending an additional priming packet over the network connection; and if the particular configuration parameter has reached the predetermined setting, terminating said adjusting.

13. The method as recited in claim 11, wherein the sequence of sub-transfers includes a particular sub-transfer followed by another sub-transfer, wherein the subset of primed network connections selected for the particular sub-transfer differs from the subset of primed network connections selected for the another data transfer.

14. The method as recited in claim 11, further comprising:
in response to determining that the data transmission over the respective one of the network connections does not meet the threshold performance criterion,
closing the respective one of the network connections;
opening an additional network connection;
adjusting one or more configuration parameters associated with the additional network connection, wherein said adjusting comprises sending one or more priming packets over the additional network connection; and
designating the additional network connection to be included in a set of network connections to be used to implement a remainder of the bulk transfer.

15. The method as recited in claim 11, wherein said determining whether the data transmission over each respective network connection meets the threshold performance criterion comprises:
inserting instrumentation data into a packet transmitted over each respective network connection.

16. The method as recited in claim 11, further comprising:
partitioning data corresponding to the bulk transfer into a plurality of stripes of a predetermined transmission stripe size; and
transmitting consecutive stripes on each of two or more primed network connections selected for a given sub-transfer of the sequence of sub-transfers.

17. A storage medium storing program instructions, wherein the instructions are computer executable to:
establish a plurality of network connections designated to be used for a bulk transfer;
adjust one or more configuration parameters associated with each network connection of the plurality of network connections, wherein to adjust the one or more configuration parameters, the instructions are further executable to send one or more priming packets associated with the bulk data transfer over each network connection to generate a plurality of primed network connections;
perform the bulk transfer as a sequence of sub-transfers, wherein each sub-transfer includes a transmission of a predetermined amount of the data over each primed network connection of a selected subset of the plurality of primed network connections, wherein a reserved subset of the plurality of primed network connections are not initially used in performing the bulk transfer as the sequence of sub-transfers;
determine whether data transmission over each respective network connection selected for a corresponding sub-transfer of the sequence of sub-transfers meets a threshold performance criterion; and
in response to determining that the data transmission over a respective one of the network connections does not meet the threshold performance criterion, automatically determine that the respective one of the network connections is an unsatisfactory connection and automatically retransmitting at least a portion of the corresponding sub-transfer over one of the primed network connections of the reserved subset of the plurality of primed network connections.

18. The storage medium as recited in claim 17, wherein to adjust the one or more configuration parameters, the instructions are further executable to:
determine, after sending a particular priming packet of the plurality of priming packets, whether a particular configuration parameter of the one or more configuration parameters has reached a predetermined setting;
if the particular configuration parameter has not reached the predetermined setting, send an additional priming packet over the network connection; and
if the particular configuration parameter has reached the predetermined setting, determine that no additional priming packets are to be sent over the network connection.

19. The storage medium as recited in claim 17, wherein the sequence of sub-transfers includes a particular sub-transfer followed by another sub-transfer, wherein the subset of primed network connections selected for the particular sub-transfer differs from the subset of primed network connections selected for the another data transfer.

20. The storage medium as recited in claim 17, wherein the instructions are further executable to:
in response to determining that the data transmission over the respective one of the network connections does not meet the threshold performance criterion,
close the respective one of the network connections;
open an additional network connection;
adjust one or more configuration parameters associated with the additional network connection, wherein said adjusting comprises sending one or more priming packets over the additional network connection; and
designate the additional network connection to be included in a set of network connections to be used to implement a remainder of the bulk transfer.

21. The storage medium as recited in claim 17, wherein the instructions are further executable to:
partition data corresponding to the bulk transfer into a plurality of stripes of a predetermined transmission stripe size; and
transmit consecutive stripes on each of two or more primed network connections selected for a given sub-transfer of the sequence of sub-transfers.

* * * * *